(12) United States Patent
Tokuda et al.

(10) Patent No.: US 8,111,838 B2
(45) Date of Patent: Feb. 7, 2012

(54) CONFERENCING APPARATUS FOR ECHO CANCELLATION USING A MICROPHONE ARRANGEMENT

(75) Inventors: Toshimichi Tokuda, Fukuoka (JP); Natsushi Ono, Fukuoka (JP); Ryoichi Yuge, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1017 days.

(21) Appl. No.: 12/037,426

(22) Filed: Feb. 26, 2008

(65) Prior Publication Data

US 2008/0205665 A1    Aug. 28, 2008

(30) Foreign Application Priority Data

Feb. 28, 2007   (JP) .................................. 2007-048762
Jan. 21, 2008   (JP) .................................. 2008-010131

(51) Int. Cl.
    *H04R 3/00*   (2006.01)
(52) U.S. Cl. ........................................................ 381/92
(58) Field of Classification Search .............. 381/92–94;
                                              397/420.02, 202, 204
    See application file for complete search history.

(56) References Cited

U.S. PATENT DOCUMENTS

| 5,121,426 | A * | 6/1992 | Baumhauer et al. ..... 379/420.03 |
| 7,085,245 | B2 * | 8/2006 | Song et al. .................... 370/290 |
| 7,593,539 | B2 * | 9/2009 | Oxford ........................... 381/361 |
| 7,856,097 | B2 * | 12/2010 | Tokuda ..................... 379/406.05 |
| 7,907,745 | B2 * | 3/2011 | Oxford ........................... 381/361 |
| 2005/0058300 | A1 * | 3/2005 | Suzuki et al. ................... 381/92 |
| 2005/0286714 | A1 * | 12/2005 | Tokuda .................... 379/406.05 |
| 2009/0268899 | A1 * | 10/2009 | Tokuda et al. ........... 379/420.02 |
| 2010/0166212 | A1 * | 7/2010 | Ishibashi et al. ................ 381/92 |

FOREIGN PATENT DOCUMENTS

JP    7-061098    6/1995

OTHER PUBLICATIONS

English language Abstract of JP 3-293846 A.

* cited by examiner

*Primary Examiner* — Nathan Ha
(74) *Attorney, Agent, or Firm* — Greenblum & Bernstein, P.L.C.

(57) ABSTRACT

A voice conference apparatus includes a sound collecting unit and a loudspeaker, while the sound collecting unit has a directional polar sensitivity characteristic which has a higher sensitivity with respect to sounds which are radiated from at least one direction, as compared with sounds radiated from other directions. The sound collecting unit of the voice conference apparatus has a plurality of omnidirectional microphones, and forms a desirable sensitivity characteristic. Since the omnidirectional microphones are employed, aging changes and fluctuations contained in the sensitivity characteristics of the respective sound collecting units can be reduced, so that the sensitivity characteristics thereof can become stable, and thus, full duplex communications with higher qualities can be carried out.

22 Claims, 18 Drawing Sheets

FIG. 7
(a)
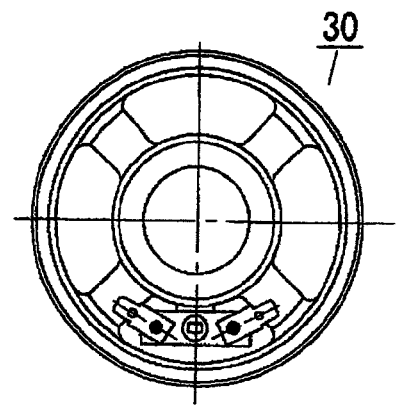
(b)
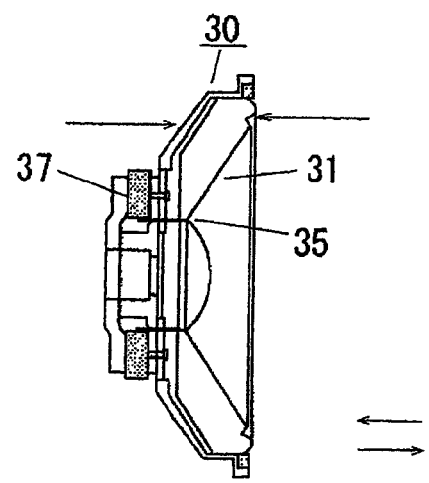
(c)
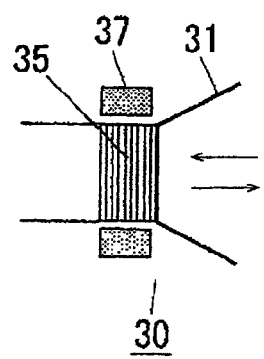

FIG. 14
(a)
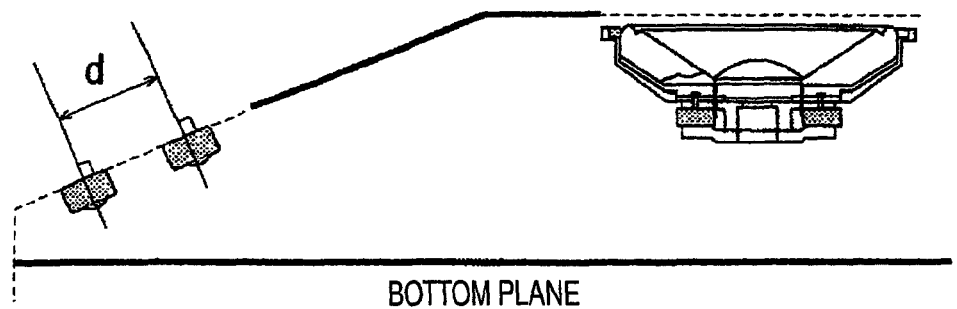
(b)
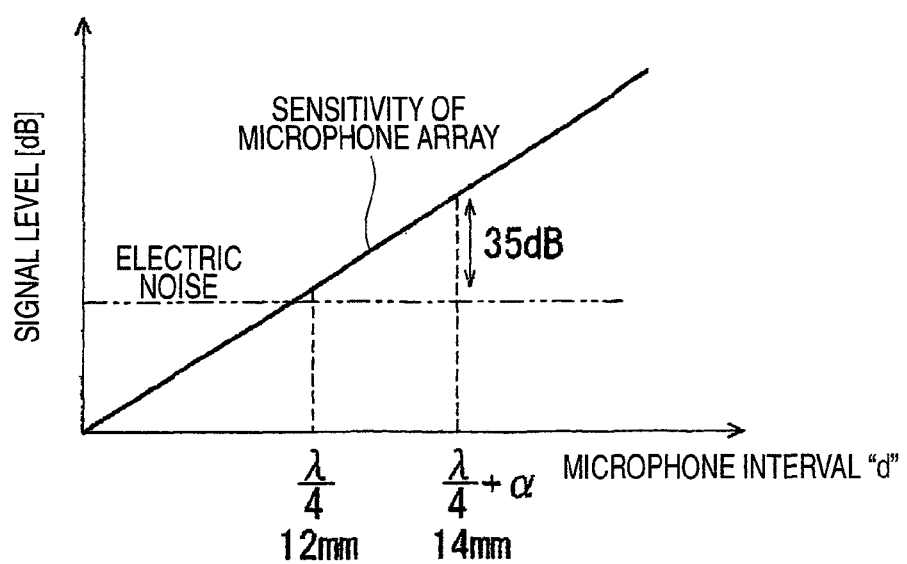

FIG. 16
(a)
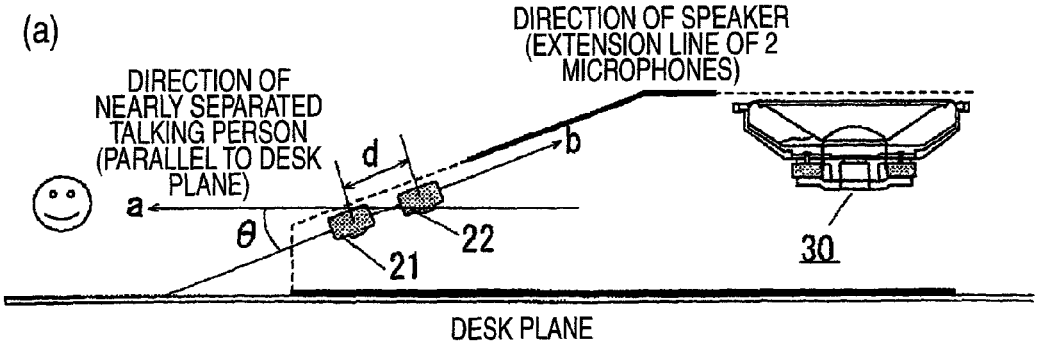
(b) (c)
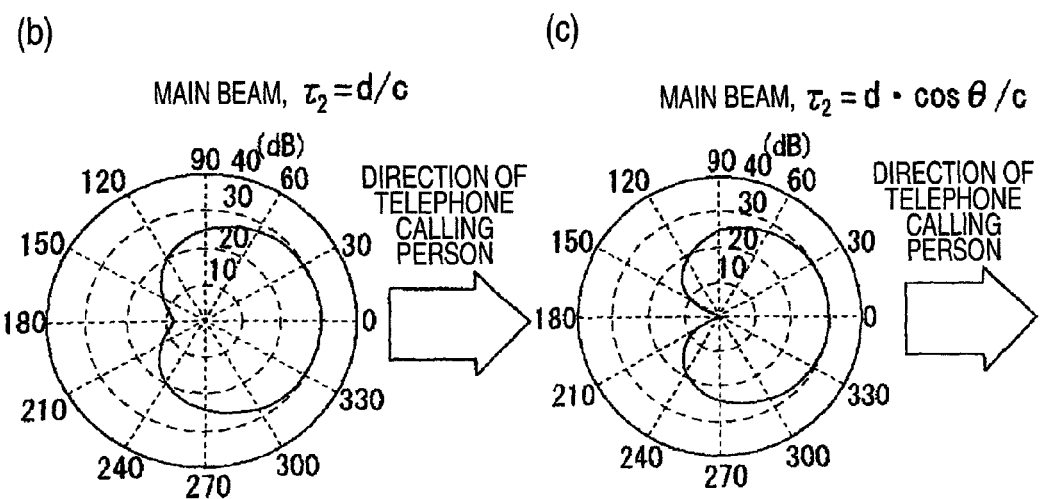
(d) (e)
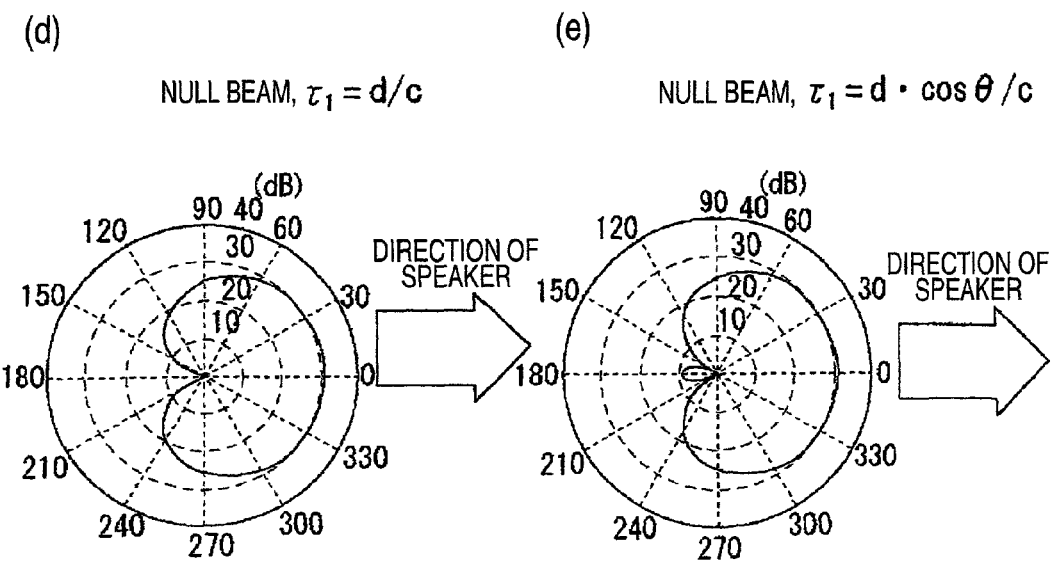

CONFERENCING APPARATUS FOR ECHO CANCELLATION USING A MICROPHONE ARRANGEMENT

BACKGROUND OF THE INVENTION

The present invention relates to a voice conference apparatus capable of establishing a voice conference between remote places by employing the communication means (the communication network).

Very recently, voice conference apparatuses capable of establishing voice conferences between remote places by employing communication means have been gradually popularized. It is desirable that such voice conference apparatuses have been designed in such a way that even when a plurality of persons are present at respective installation places of these voice conference apparatuses, these plural persons can operate the voice conference apparatuses. As a typical apparatus example, the below-mentioned telephone conference apparatuses have been proposed (refer to, for example, patent publication 1). That is, one typical telephone conference apparatus includes a plurality of microphone devices for converting audible sounds into electric signals; a loudspeaker for converting the electric signals into audible sounds; and a voice communication network for electrically connecting these microphone devices and the loudspeaker to a telephone line. Each of the microphone devices has such a directional polar sensitivity characteristic which has a high sensitivity with respect to sounds which are radiated from at least one direction, as compared with sounds radiated from other directions. Furthermore, the directional polar sensitivity characteristic has a main lobe, side lobes, and a null present between paired lobes. The loudspeaker is arranged at a position of the null of the directional polar sensitivity characteristic, which is located between the side lobes adjacent to the main lobe.

The loudspeaker provided in this telephone conference apparatus has been installed at the null of the polar sensitive patterns as to the main lobe and the side lobes adjacent to the main lobe. As a result, acoustic coupling effects between the loudspeaker and the microphone devices are essentially reduced, so that the telephone conference apparatus can be operated in a full duplex mode, that is to say, while voices of the counter panties are mutually outputted from the loudspeakers so as to hear stories, persons can produce voices by employing the microphone devices.

While each of the microphone devices utilized in this telephone conference apparatus has one or plural pieces of microphones, directional microphones are used as the respective microphone devices in order to establish desirable sensitivity characteristics.

[Patent Citation 1] U.S. Pat. No. 5,121,426 (JP-A-3-293846)

However, the directional polar sensitivity characteristics of the directional microphones have characteristic fluctuations in view of manufacturing aspects, and magnitudes of the main lobes and the side lobes, and also, the null positions are difference from each other as to the respective directional microphones. Also, in such a case that the directional microphones are installed within an apparatus, these directional microphones may be readily influenced by peripheral structural components thereof. Moreover, as to the directional polar sensitivity characteristics of such microphones, the magnitudes of the main lobes and the side lobes, and also, the null positions are changed due to aging effects thereof. As previously described, there is such a problem that the sensitivities of the directional microphones are unstable, and thus, qualities as to the full duplex communication of the telephone conference apparatus are lowered.

SUMMARY OF THE INVENTION

The present invention has an object to provide a voice conference apparatus having a stable directional polar sensitivity characteristic, by which a quality of a full duplex communication thereof is not lowered.

To solve the above-described problem, there is provided a voice conference apparatus according to the present invention, comprising:

a microphone unit which has a plurality of omnidirectional microphones for collecting a sound to output a transmission voice signal;

a speaker which emits a sound on the basis of a reception voice signal;

a communication unit which transmits the transmission voice signal and receives the reception voice signal; and a sensitivity characteristic forming unit which forms a desirable sensitivity characteristic of the microphone unit.

With employment of the above-described arrangement, the desirable sensitivity characteristic is formed by the plurality of omnidirectional microphones, so that the sensitivity characteristic can be made stable, and the quality of the full duplex communication is not deteriorated.

BRIEF DESCRIPTION OF THE DRAWINGS

FIG. 7 is an explanatory diagram for explaining the loudspeaker provided in the embodiment 1 of the present invention.

FIG. 14 is a diagram for illustratively indicating another example as to a correction of the microphone interval as to the voice conference apparatus according to the embodiment 1 of the present invention.

FIG. 16 is a diagram for indicating an example as to a correction of a signal delay time as to a voice conference apparatus according to an embodiment 2 of the present invention.

DETAILED DESCRIPTION OF THE PREFERRED EMBODIMENTS

Referring now to drawings, a description is made of various embodiments of the present invention.
Embodiment 1

Figure 1:
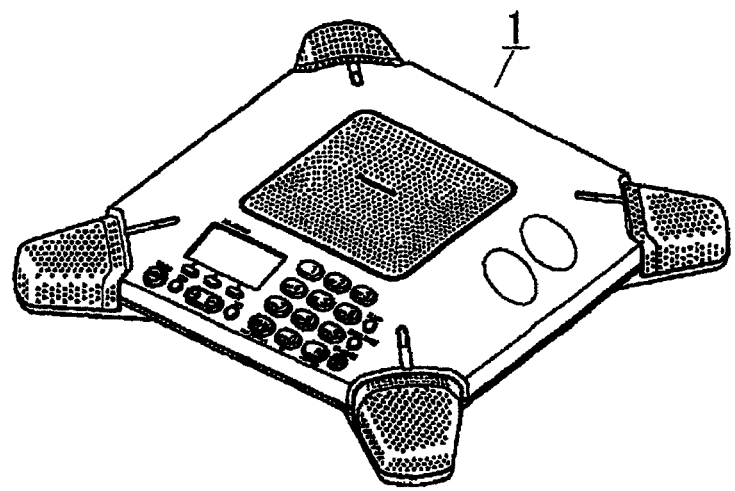
FIG. 1 is a perspective view for indicating a voice conference apparatus according to an embodiment 1 of the present invention.
Figure 2:
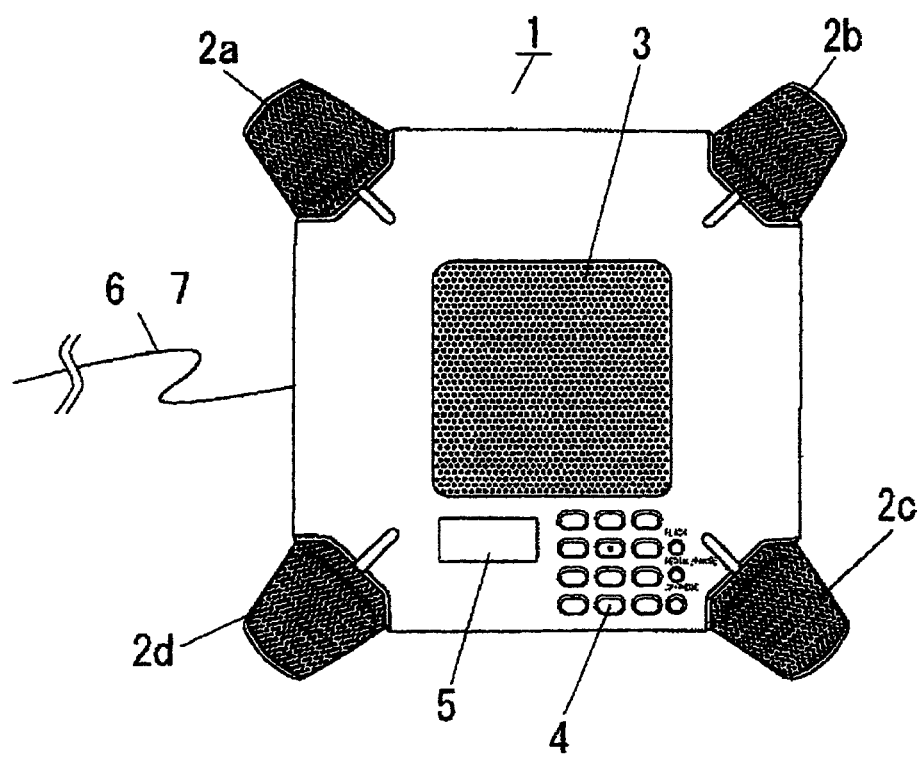
FIG. 2 is an upper view for showing the voice conference apparatus according to the embodiment 1 of the present invention.

FIG. 1 is a perspective view for indicating a voice conference apparatus according to an embodiment 1 of the present invention. FIG. 2 is an upper view for showing the voice conference apparatus according to the embodiment 1 of the present invention, namely, is a diagram when the voice conference apparatus of FIG. 1 is viewed from an upper plane thereof.

In FIG. 1 and FIG. 2, reference numeral 1 shows a voice conference apparatus; reference numerals 2a to 2d represent sound collecting units for collecting voices of users; reference numeral 3 indicates a speaker unit for reproducing telephone reception voices; reference numeral 4 shows an operation button for performing telephone calling/receiving operations, and various of setting operations; reference numeral 5 represents a display unit for displaying thereon a telephone communication condition, a setting condition, and the like; and reference numeral 6, or 7 indicates a communication cable which is connected to a communication line of a communication counter party. Namely, the reference numeral 6 is an Ethernet (registered trademark) cable, and the reference numeral 7 is a telephone line. Any one of the communication cables 6 and 7 is utilized in correspondence with communication means. In an actual case, two, or more sets of the voice conference apparatuses which are positionally separated from each other are connected via the communication means to each other so as to be used.

Figure 3:
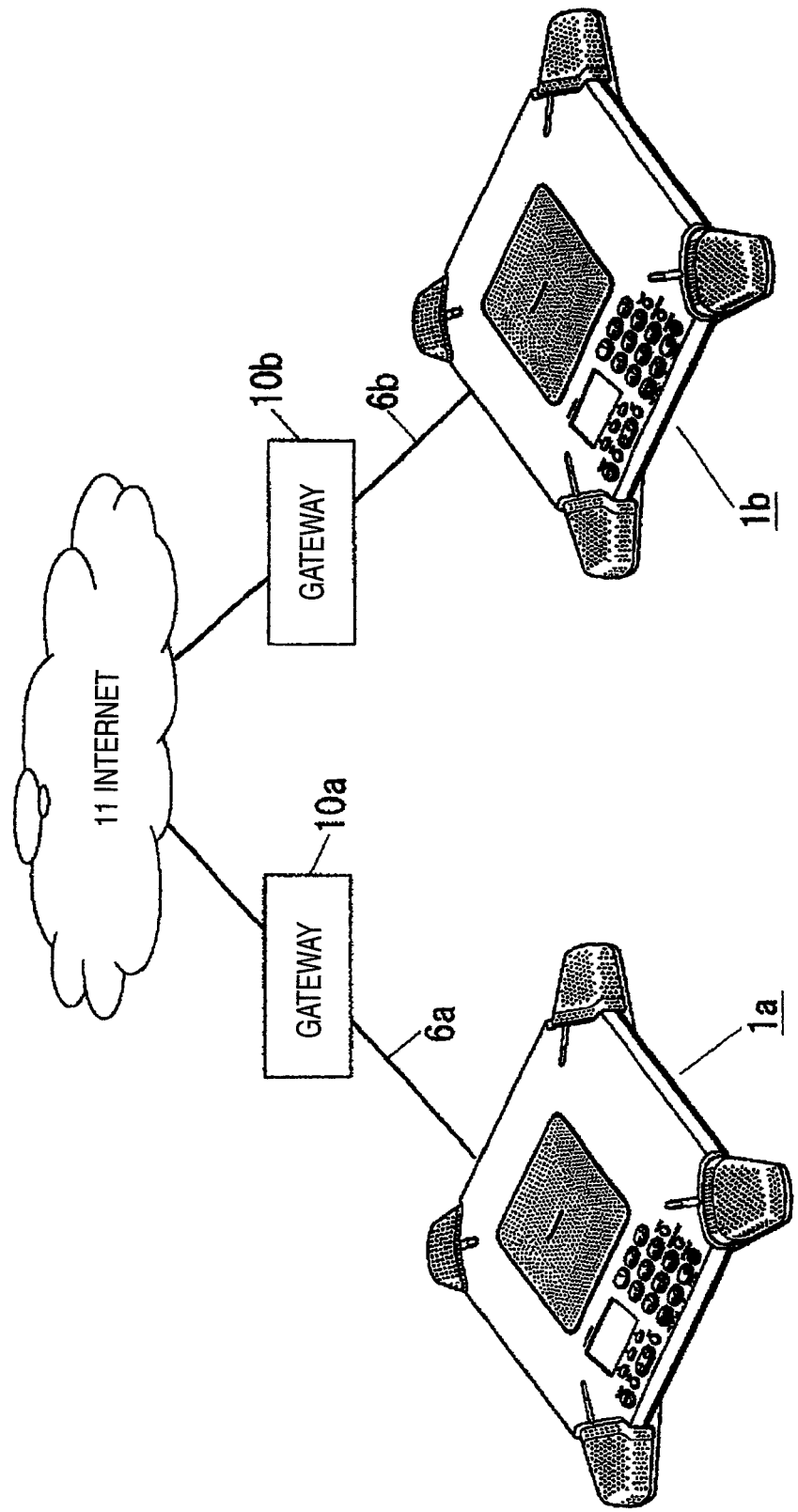
FIG. 3 is a diagram for illustratively showing a structural example in which two sets of the voice conference apparatuses according to the embodiment 1 of the present invention are connected to each other.
Figure 4:
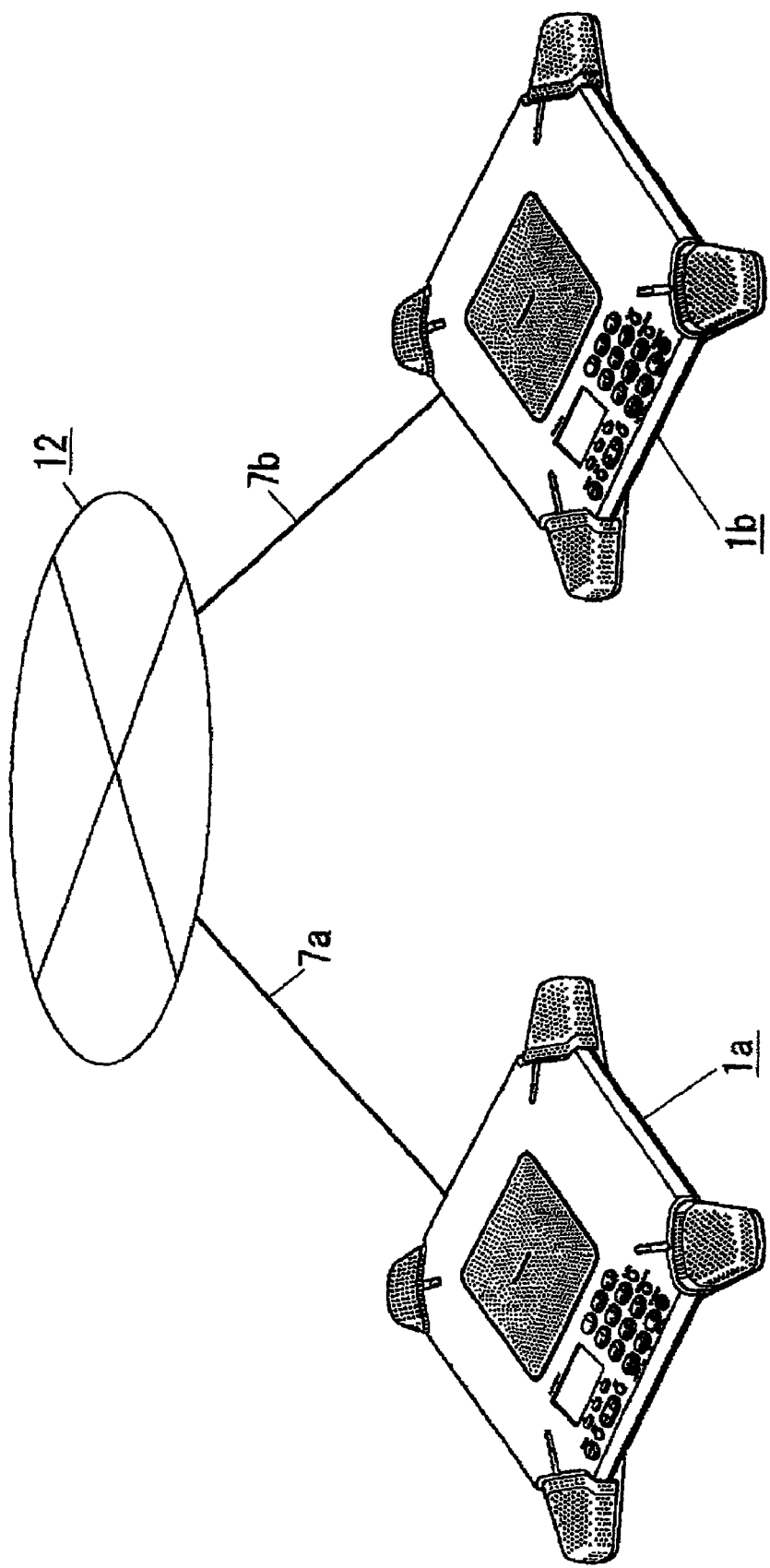
FIG. 4 is a diagram for illustratively representing another structural example in which two sets of the voice conference apparatuses according to the embodiment 1 of the present invention are connected to each other.

FIG. 3 and FIG. 4 are diagrams for illustratively indicating a structural example in which 2 sets of the voice conference apparatuses according to the embodiment 1 of the present invention are connected to each other, namely, representing such a condition when two sets of the voice conference apparatuses 1a and 1b are connected to each other through the Ethernet (registered trademark) cable 6.

The voice conference apparatuses 1a and 1b indicated in FIG. 3 are identical to the voice conference apparatus 1 shown in FIG. 1. The voice conference apparatuses 1a and 1b are connected via a gateway 10a and another gateway 10b to the Internet 11, so that the voice conference apparatuses 1a and 1b can be telephone-communicated with each other. In the case of FIG. 3, voice signals transmitted and received between the voice conference apparatuses 1a and 1b are such data that digital voice signals are processed as packet data.

It should be understood that other terminal apparatuses, a hub, a router, or the like may be alternatively connected to the gateway 10a, or the gateway 10b. Also, other terminal apparatuses, a hub, a router, or the like may be alternatively connected between the gateway 10a and the voice conference apparatus 1a, or between the gateway 10b and the voice conference apparatus 1b.

Also, as shown in FIG. 4, the respective voice conference apparatuses 1a and 1b may be alternatively connected via telephone lines 7a and 7b to a public telephone line 12. In this case, analog voice signals are transmitted and/or received on at least telephone lines 7a and 7b.

It should also be noted that the voice conference apparatuses 1a and 1b according to the embodiment 1 are designed in such a manner that a voice of a user of the relevant voice conference apparatus 1a, or 1b, which is inputted to respective sound collecting units (correspond to 2a to 2d of voice conference apparatus 1 shown in FIG. 2), is not outputted to a speaker unit (corresponding to speaker unit 3 of voice conference apparatus 1 shown in FIG. 2) built in the own voice conference apparatus 1a, or 1b. This designing reason is given as follows: That is, in such a case that the voice of the user of the relevant voice conference apparatus 1a, or 1b, which is inputted to the built-in microphone, is designed to be outputted from the speaker of the own voice conference apparatus 1a, or 1b, the howling phenomenon may readily occur. Nevertheless, if an apparatus by which a howling phenomenon never occurs can be constructed, then the voice of the user of the relevant voice conference apparatus, which is inputted to the built-in microphone, may be alternatively outputted from the speaker of the own voice conference apparatus.

With employment of the arrangements shown in FIG. 1 to FIG. 4, while a communication person who uses the voice conference apparatus 1a is located apart from another communication person who uses the voice conference apparatus 1b, these communication persons can establish conversation. It should also be noted that the communication persons who use the respective voice conference apparatuses 1a and 1b are not limited only to a single person, but also a plurality of persons.

Figure 5:
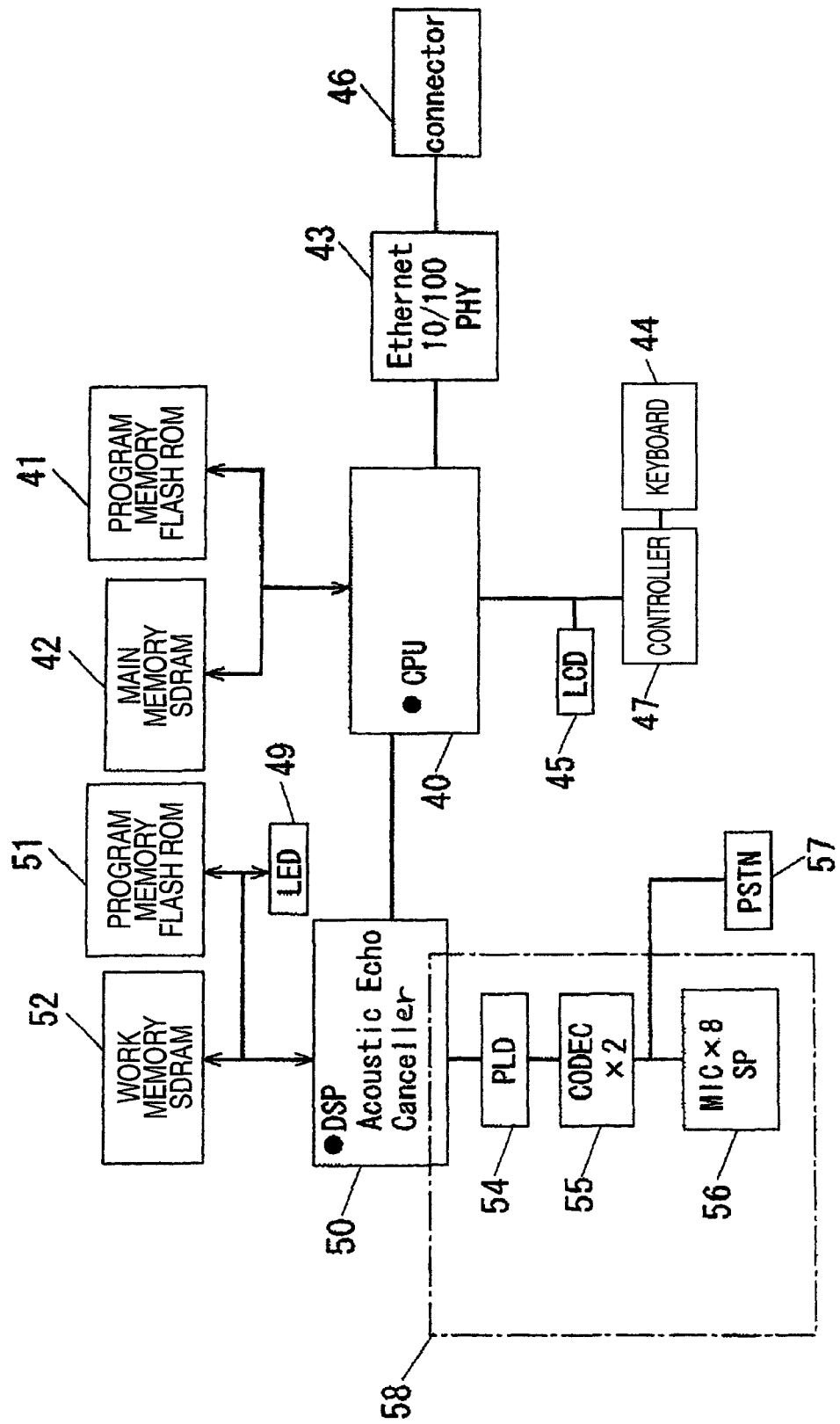
FIG. 5 is a schematic block diagram for indicating hardware of the voice conference apparatus according to the embodiment 1 of the present invention.

FIG. 5 is a schematic block diagram for indicating hardware of the voice conference apparatus 1 according to the embodiment 1 of the present invention.

In FIG. 5, reference numeral 40 shows a CPU which contains the DSP, reference numeral 41 indicates a program memory which stores thereinto program software for executing various sorts of process operations by the CPU 40; and reference numeral 42 represents a work main memory which is required in order to execute various sorts of programs stored in the program memory 41 by the CPU 40. With employment of these CPU 40 and memories 41 and 42, packet process operations are performed in levels higher than the MAC layer level, and such output process operations as dial tone and melody are carried out.

In this drawing, reference numeral 43 shows a PHY chip for executing a protocol process operation in the physical layer level of Ethernet (registered trademark); and reference numeral 46 indicates a connector for connecting thereto the Ethernet (registered trademark) cable 6, which is usually called as an "RJ-45." Packets of voice data which are processed in the CPU 40 are transmitted and/or received via the PHY chip 43, the connector 46 and the Ethernet (registered trademark) cable 6.

Further, a keyboard 44, an LCD 45, and a controller 47 are connected to the CPU 40. The keyboard 44 is provided inside the operation button 4, and the LCD 45 is provided inside the display unit 5. The controller 47 conducts input processing operations of the keyboard 44.

Reference numeral 50 indicates a DSP for executing an echo canceling process operation; reference numeral 51 indicates a program memory which stores thereinto program software for executing various sorts of process operations by the DSP 50; and reference numeral 52 represents a work main memory which is required in order to execute various sorts of programs stored in the program memory 51.

A microphone/speaker unit 56 is connected via a timing control-purpose PLD 54 and a CODEC unit 55 to the DSP 50. After analog input/output signals of the microphone/speaker unit 56 are converted into digital input/output data in the CODEC unit 55, an echo canceling process operation between microphones and a loudspeaker is carried out in the DSP 50. A more detailed block diagram as to a partial block 58 for these units will be explained with reference to FIG. 6. The microphone/speaker unit 56 includes 8 pieces of microphones and 1 piece of a loudspeaker. 2 pieces of the microphones are installed in each of the sound collecting units 2a to 2d respectively, and the loudspeaker is installed in the speaker unit 3, the more detailed arrangements of which will be discussed later with reference to FIG. 6 and the succeeding drawings.

In such a case that the voice conference apparatus 1 according to the embodiment 1 is connected via the telephone line 7 to the public telephone line 12 so as to be operated, a public line I/F unit 57 used to connect the telephone line 7 is furthermore connected with respect to the CODEC unit 55, as indicated by a dot line of FIG. 5. A detailed content of the public line I/F unit 57 is omitted.

Figure 6:
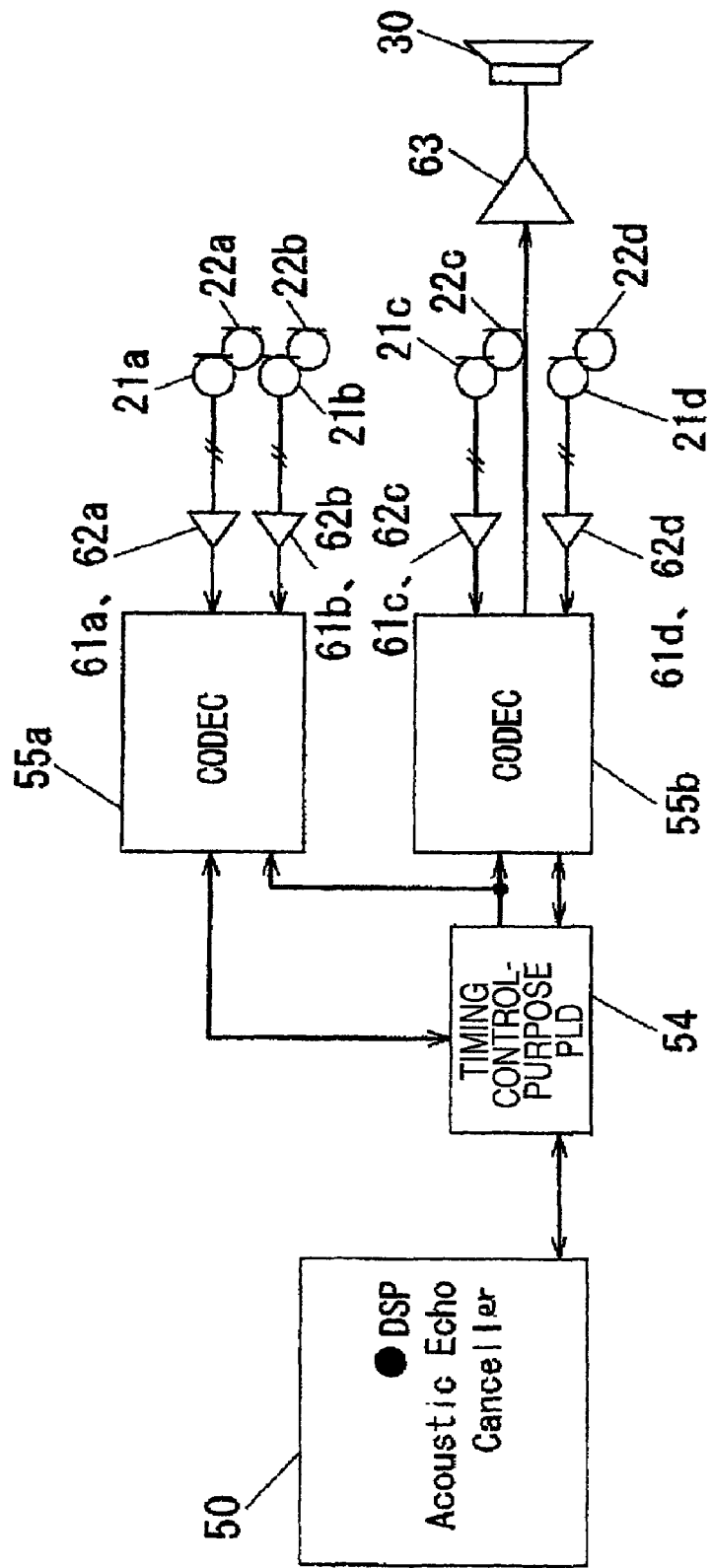
FIG. 6 is a schematic block diagram for showing a DSP, a timing control-purpose PLD, a CODEC unit, and a microphone/loudspeaker unit employed in the voice conference apparatus according to the embodiment 1 of the present invention.

FIG. 6 is a schematic block diagram for showing more detailed structures than the structures of FIG. 5 as to the DSP 50, the timing control-purpose PLD 54, the CODEC unit 55, and the microphone/loudspeaker unit 56.

In the embodiment 1, the CODEC unit 55 has two sets of CODEC-IC 55a and 55b. As represented in FIG. 6, 8 pieces of omnidirectional microphones 21a to 21d and 22a to 22d and a loudspeaker 30 are connected via respective microphone driving circuits 61a to 61d and 62a to 62d, and also, a speaker amplifying circuit 63 to the CODEC-IC 55a and 55b. In an actual case, both the microphone 21a and the microphone driving circuit 61a, and both the microphone 22a and the microphone driving circuit 62a are two series of independent circuits. However, in FIG. 6, connection lines between the microphone driving circuits 61a and 62a, and between the microphones 21a and 22a, and the CODEC unit 55 are omitted as a single connection line. A similar connecting relationship between the microphones 21b to 21d and 22b to 22d, the microphone driving circuits 61b to 61d and 62b to 62d may be established.

Next, a description is made of arranging relationships between the microphones 21, 22, and the loudspeaker 30, which are contained in the voice conference apparatus 1 according to the embodiment 1.

FIG. 7 is an explanatory diagram for explaining a loudspeaker employed in the embodiment 1 of the present invention, namely, for showing an example of the loudspeaker 30.

Figure 8:
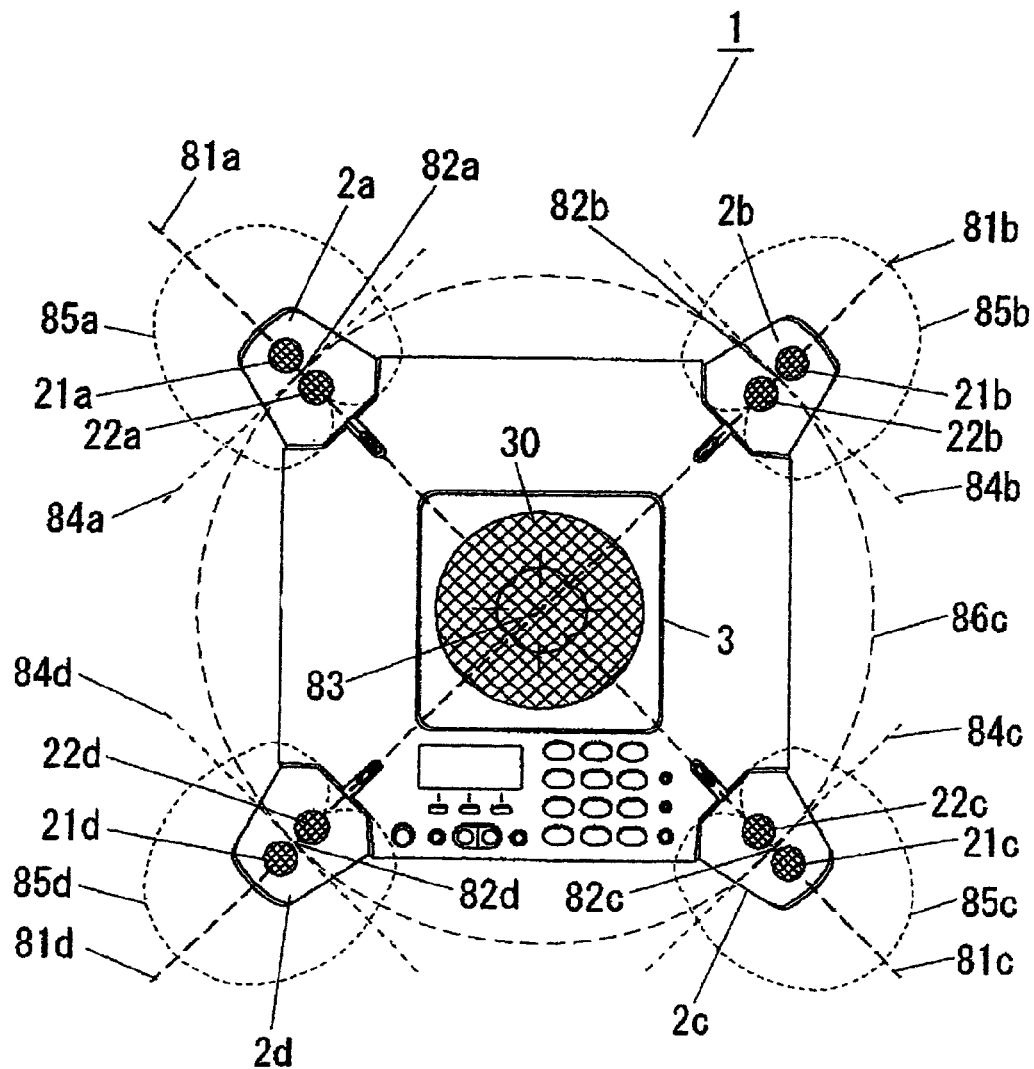
FIG. 8 is a diagram for indicating an arranging relationship between the microphones and the loudspeaker employed in the embodiment 1 of the present invention.

FIG. 8 is a diagram for representing one arranging relationship between the microphones 21 and 22, and the loudspeaker 30 in the embodiment 1 of the present invention. Namely, FIG. 8 represents such a condition that the arranging relationship in such a case that the microphones 21 and 22, and the loudspeaker 30 shown in FIG. 7 are built in the voice conference apparatus 1 is viewed from an upper plane of a housing thereof.

Figure 9:
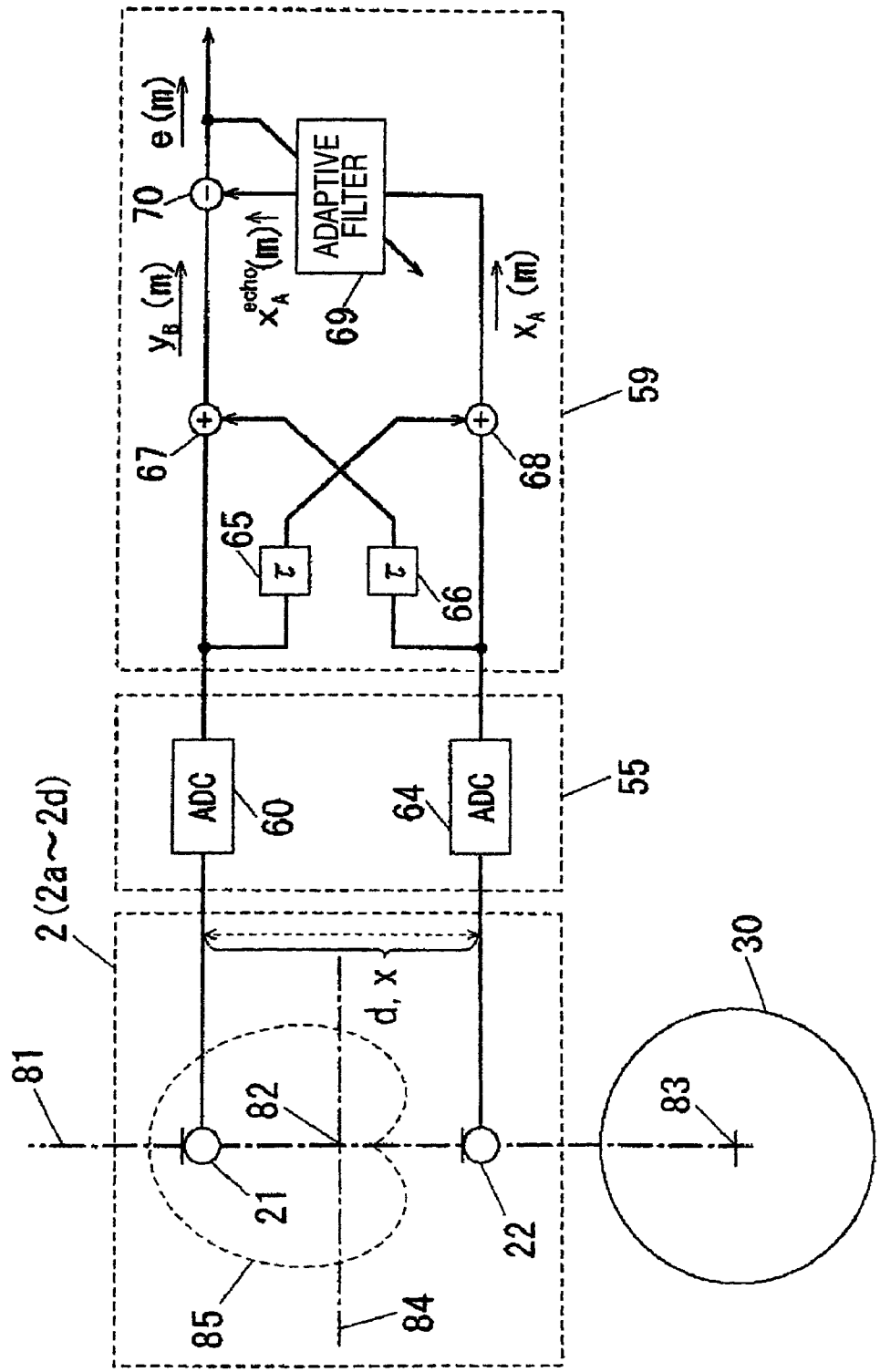
FIG. 9 is a schematic diagram for representing process blocks related to the microphone of the DSP provided in the embodiment 1 of the present invention.

FIG. 9 is a schematic block diagram for indicating a process block related to the microphones of the DSP 50 in the embodiment 1 of the present invention, namely, shows a process block of a circuit portion related to the microphones 21 and 22 within the DSP 50.

Figure 10:
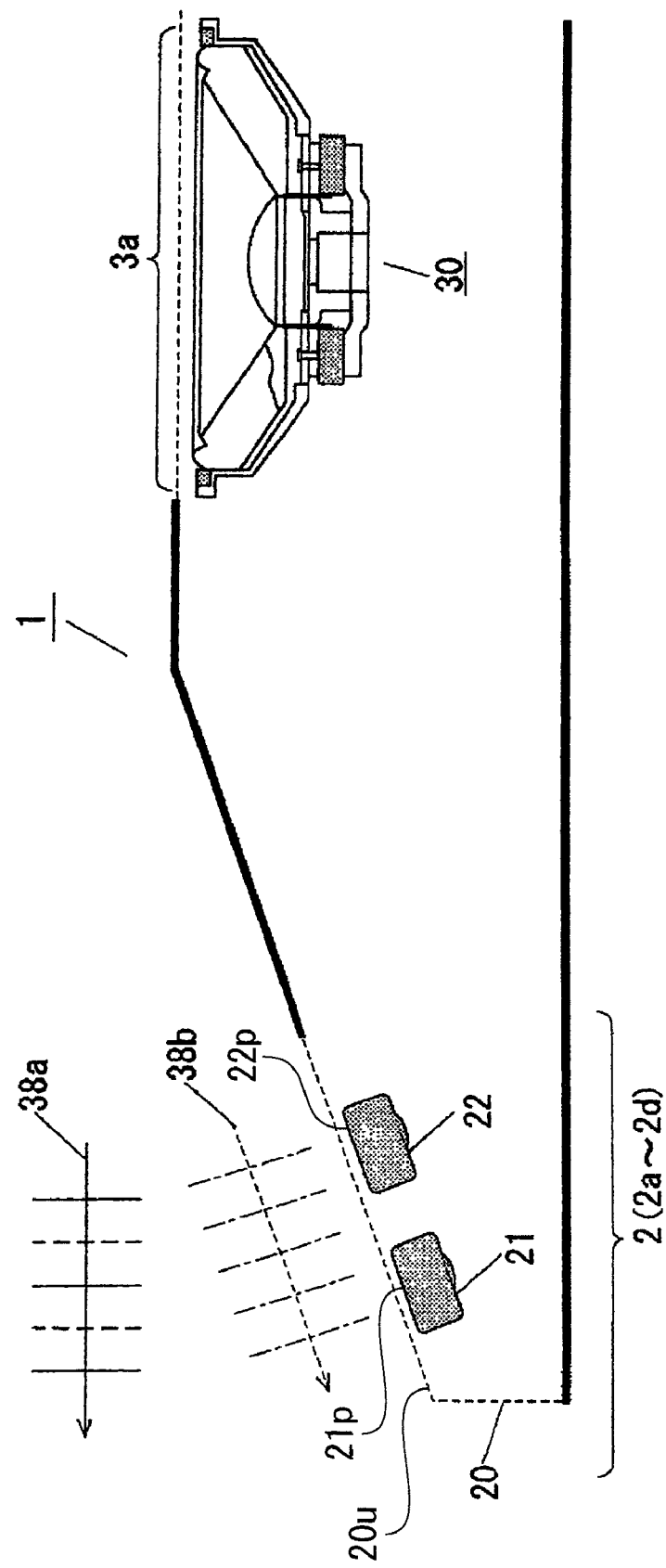
FIG. 10 is a diagram for indicating another arranging relationship between the microphones and the loudspeaker employed in the embodiment 1 of the present invention.

FIG. 10 is a diagram for illustratively showing another arranging relationship between the microphones 21 and 22, and the loudspeaker 30 employed in the embodiment 1 of the present invention, namely, FIG. 10 shows the arranging relationship between the microphones 21, 22 arranged in one of the sound collecting units 20a to 20d of the voice conference apparatus 1, and the loudspeaker 30 arranged in the speaker unit 3, as viewed along the sectional direction thereof.

In the sound collecting units 2a to 2d, and the speaker unit 3 of FIG. 8, the microphones 21a to 21d and 22a to 22d, and also, the loudspeaker 30 are illustrated in such a manner that positions of these structural components 21a to 21d, 22a to 22d, and 30 can be apparently grasped. However, in the actual case, these microphones 21a to 21d and 22a to 22d, and loudspeaker 30 are arranged inside the sound collecting units 2a to 2d, and the speaker unit 3, and therefore, cannot be directly and visibly recognized from the external space.

In FIG. 6, sound waves (acoustic waves) which are entered to the microphones 21a to 21d and 22a to 22d are converted into voltages. The converted voltages are processed by the CODEC unit 55 to be converted into digital signals. These digital signals are processed by the DSP 50 so as to perform thereto the echo canceling process operation. The echo-canceled digital signals are processed by the CPU 40 of FIG. 5 so as to perform thereto the packet processing operation. And then, the packet-processed digital acoustic signals are transmitted via the PHY chip 43 and the connector 46 to a voice conference apparatus of a counter party which is located on Ethernet (registered trademark), or the Internet (for example, if present voice conference apparatus in FIG. 3 is apparatus "1a", then voice conference apparatus of counter party is apparatus "1b").

FIG. 7(*a*) is a rear view of the loudspeaker 30, FIG. 7(*b*) is a sectional structural diagram of the loudspeaker 30, as viewed from the side plane direction, and FIG. 7(*c*) is a schematic sectional view for showing operations of the loudspeaker 30 in a simple manner.

Although the loudspeaker 30 has such a structure as indicated in FIG. 7(*a*) and FIG. 7(*b*) in detail, a basic structure of this loudspeaker 30 is illustrated in FIG. 7(*c*). That is, FIG. 7(*c*) can explain operations of the loudspeaker 30 based upon cone paper 31 functioning as a diaphragm, a coil 35, and a magnet 37. In other words, when an electric voice signal derived from the speaker amplifying circuit 63 in FIG. 5 is supplied to the coil 35, the cone paper 31 connected to the coil 35 is vibrated along forward and backward directions, so that the electric voice signal may become sounds in accordance with the Fleming's rule. The vibration directions of the cone paper 31 are illustratively represented in FIG. 7(*a*) to FIG. 7(*c*).

Sounds outputted from the loudspeaker 30 are voices which are collected in a voice conference apparatus of a counter party which is located on either Ethernet (registered trademark) or the Internet (for example, if present voice conference apparatus in FIG. 3 is apparatus "1a", then voice conference apparatus of counter party is apparatus "1b"). The packet data received from the voice conference apparatus 1a, or 1b of the counter party via the connector 46 and the PHY chip 43 shown in FIG. 6 is processed by the CPU 40 in the packet processing operation. The packet-processed voice data is converted into the analog voice signal via the DSP 50 by the CODEC unit 55. Thereafter, the analog voice signal amplified by the speaker amplifying circuit 63 is entered to the loudspeaker 30.

In the voice conference apparatus 1 according to the embodiment 1, the microphones 21a to 21d and 22a to 22d, and loudspeaker 30 are arranged as shown in FIG. 8. In other words, the vibration directions of the diaphragms as to the respective first and second microphones 21a to 21d and 22a to 22d are intersected substantially perpendicular to propagation directions of compressional waves which are generated from the loudspeaker 30. Moreover, the second microphones 22a to 22d are arranged closer to the loudspeaker 30 by a distance "d", than the first microphones 21a to 21d. In this embodiment 1, it is so assumed that each distance "d" between two sets of the microphones 21a and 22a; 21b and 22b; 21c and 22c; and 21d and 22d is equal to ¼ of a wavelength of a maximum process frequency "f", as represented in (Math. 1).

$$d = c/2Fs = c/4f = (1/4)\lambda \qquad [\text{Math 1}]$$

c: sound velocity in the air,
Fs: sampling frequency used to process input signals from two sets of microphones 21a and 22a through 21d and 22d respectively,
f: maximum processable frequency,
λ: wavelength of maximum processable frequency "f".

Figure 11:
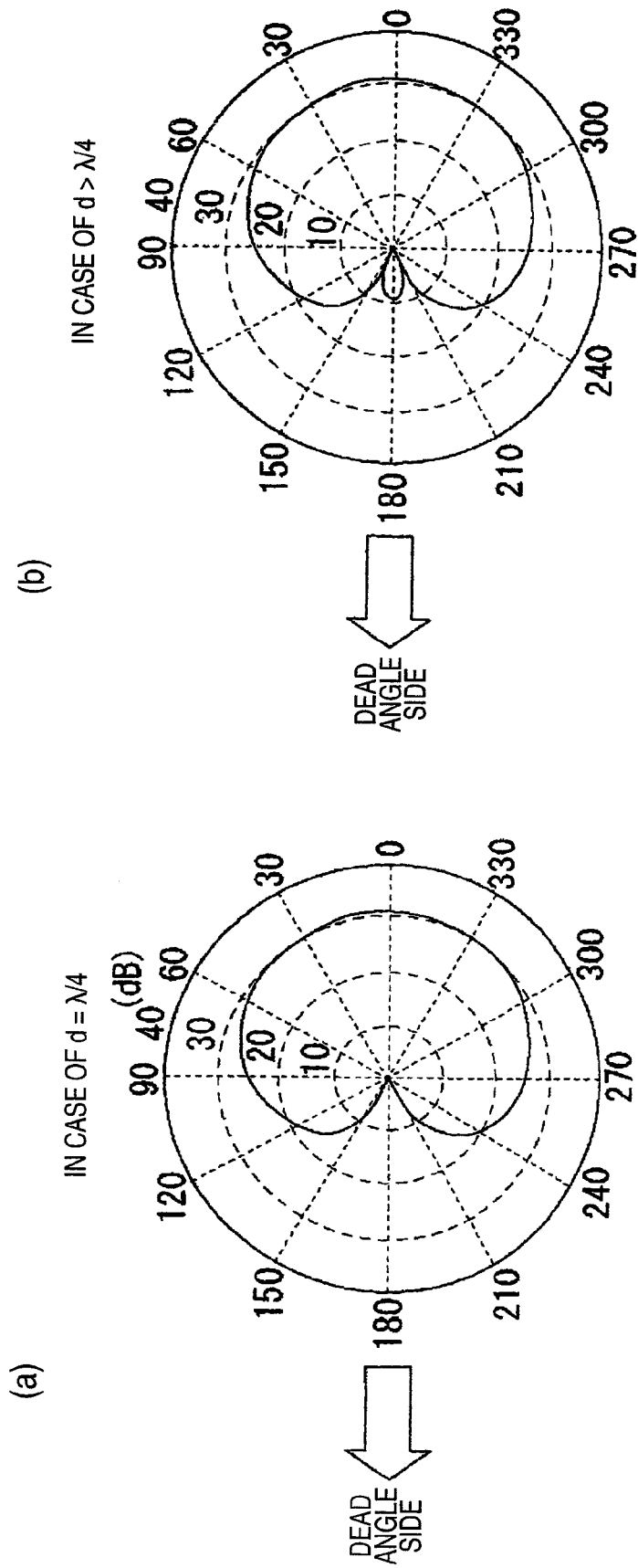
FIG. 11 is a diagram for graphically showing a relationship between an interval of the microphones and a directional pattern as to the voice conference apparatus according to the embodiment 1 of the present invention.

The reason why it is desirable to set the distance "d" between each of 2 sets of the microphones 21a and 22a through 21d and 22d respectively to approximately d=(¼)λ will now be explained with reference to FIG. 11.

Figure 12:
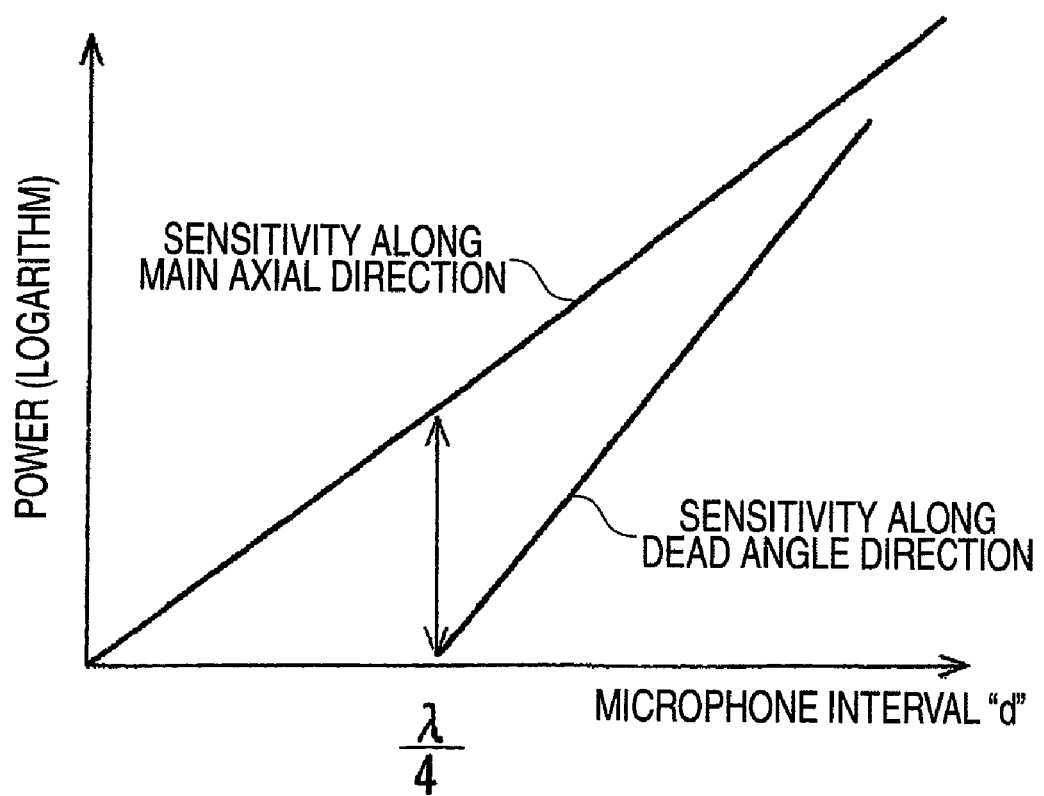
FIG. 12 is a diagram for graphically showing a relationship between an interval of the microphones and a sensitivity pattern as to the voice conference apparatus according to the embodiment 1 of the present invention.

Circular graphs of FIGS. 11(a) and 11(b) represent polar patterns for indicating directivities in the vicinity of maximum frequencies, which are synthesized by performing signal process operations as to the microphone sets, while it is desirable that sensitivities along dead angle directions become minimum. As shown in the circular graph of FIG. 11(b), if the interval "d" of the microphones 21a/22a through 21d/22d respectively becomes larger than ¼λ, then a spatial folding phenomenon may occur along the dead angle direction. On the other hand, as shown in the circular graph of FIG. 11(a), if the interval "d" of the microphones 21a/22a through 21d/22d respectively is equal to ¼λ, then the sensitivity along the dead angle direction becomes comparatively low, so that a desirable directivity can be obtained. Conversely, in such a case that the interval "d" of the microphones 21a/22a through 21d/22d respectively becomes smaller than ¼λ, as indicated in a graphic representation of FIG. 12, since a sensitivity of a main lobe on the side opposite to the dead angle is directly proportional to the interval "d" of the microphones 21a/22a through 21d/22d respectively, the sensitivity is lowered, so that noise is relatively increased, and thus, a voice quality is deteriorated. Based upon the above-described explanations, such microphone intervals "d" that both the noise and the voice quality can become optimum may become such an interval value approximated to d=λ/4.

While sound velocity "c" within the air is normally 340 m/second, in the voice conference apparatus 1 of the embodiment 1, the maximum processable frequency "f" corresponds to 7 KHz. In this case, the interval "d" between the microphones 21 and 22 becomes approximately 12 mm.

A first reason why the maximum processable frequency "f" is selected to be 7 KHz is given as follows: That is, if voice signals having frequencies up to 7 KHz can be processed, then sufficiently satisfactory feelings of sound qualities can be obtained as voice communication operations. It may be sometimes conceived that if the maximum processable frequency "f" is increased higher than 7 KHz, then voice communications with higher sound qualities than the sound qualities may be carried out. However, practically speaking, in such a voice conference apparatus 1 as indicated in the embodiment 1, such a difference of sound quality feelings which can be actually experienced by a user cannot be established. Conversely, as apparent from the (Math. 1), in order to increase the maximum processable frequency "f", the sampling frequency "Fs" must also be increased, so that a calculation amount by the DSP 50 when the sampling frequency "Fs" is increased is also increased.

A second reason why the maximum processable frequency "f" is set to 7 KHz is given as follows:

That is, a blocking range of an antialias filter employed in a normal A/D converter is set to a frequency which is lower than ½ of a sampling frequency thereof. As a result, a practically available maximum frequency in an A/D converter having a general sampling frequency of 16 KHz may become approximately 7 KHz.

Figure 13:
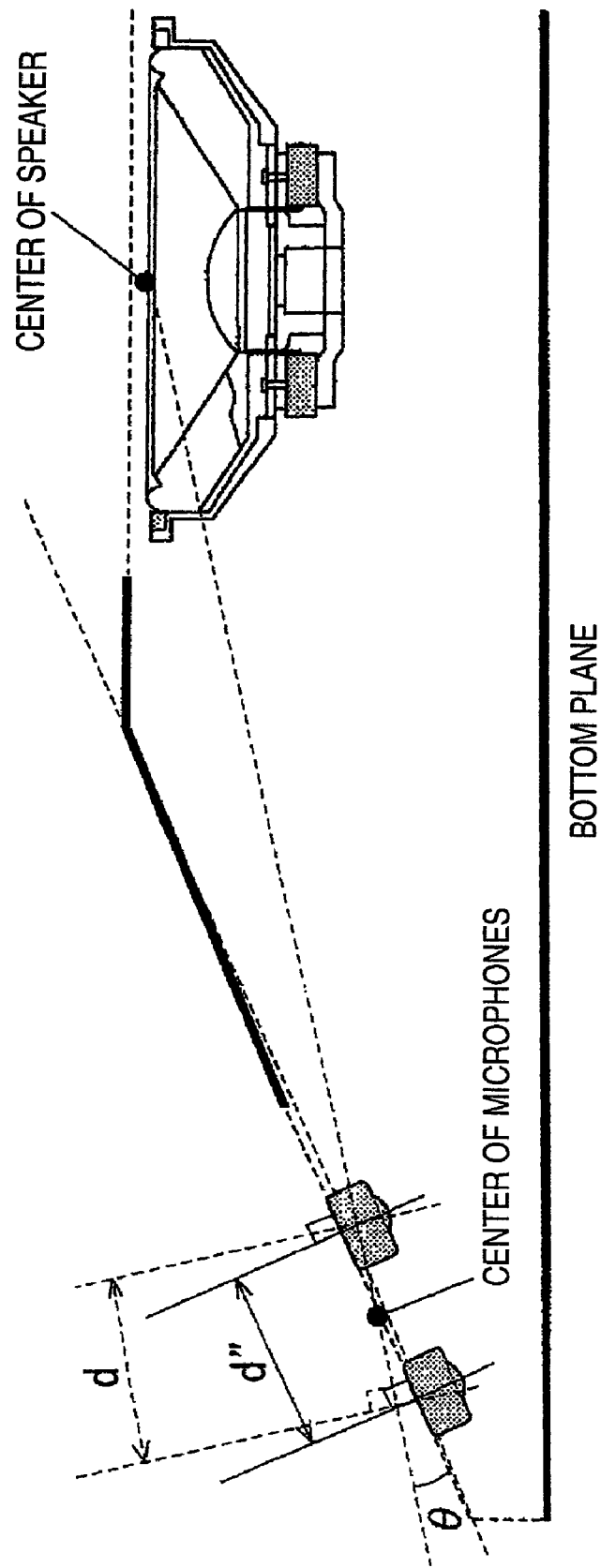
FIG. 13 is a diagram for illustratively indicating an example as to a correction of the microphone interval as to the voice conference apparatus according to the embodiment 1 of the present invention.

A description is made of such an example that a distance between two microphones is corrected based upon "d=(¼)λ" with reference to FIG. 13. In the case that an acoustic center of a speaker is not positioned on extension of a line which connects acoustic centers of two microphones, assuming now that an angle is defined as "θ", at which a line for connecting the acoustic center of the speaker with an intermediate position between these two microphones is intersected with the extension line of the two microphones, it is desirable that the interval between these two microphones is corrected as "d'=d/cos θ." As a result, a difference between travel paths in propagation directions of sound waves which reach these two microphones from the acoustic center of the speaker can satisfy the condition of "d=(¼)λ", so that desirable performance as to a sensitivity and a directivity characteristic can be achieved. For instance, in such a case that d=(¼)λ=12 mm and the angle "θ" is 30 degrees, this distance "d" of the two microphones may be corrected as d'=12 mm/cos 30 degrees=approximately 14 mm.

A description is made of another example that a distance "d" between two microphones is corrected with reference to FIG. 14. Under such a condition that mixtures of noises having constant magnitudes cannot be avoided (these noises are known as quantizing noises made by fixed point arithmetic, noises of electric boards, etc.), if a distance "d" measured between acoustic centers of two microphones indicated in FIG. 14(a) is set to "d=(¼)λ" represented in a graph of FIG. 14(b), then there are some possibilities that an S/N ratio of an acoustic signal with respect to the noises becomes short. In such a shortage of the S/N ratio, the distance "d" of the two microphones must be corrected as a distance d'=(¼)λ+α>d by which the S/N ratio can be secured. As a consequence, even under such a condition that the adverse influence caused by the noises such as the quantizing noise and the electric noise cannot be neglected, appropriate directivity performance can be achieved. For example, in such a case that $d=(¼)\lambda=12$ mm, the distance "d" is corrected as d'=approximately 14 mm.

As a concrete example in such a case that the distance "d" is corrected due to the noises, as shown in the graphs of FIG. 14(b), there are some possibilities that the distance "d" is corrected to become such a value slightly longer than "$(¼)\lambda$") in order that the S/N ratio of the acoustic signal to these noises exceeds approximately 35 dB. Since a lower limit value of quantizing noise by general-purpose 16-bit fixed point arithmetic is nearly equal to 35 dB, a maximum directivity characteristic obtained under this condition can be realized.

In the microphone units of FIG. 8, namely, in the sound collecting units 2a to 2d, each of two sets of the omnidirectional microphone devices 21a and 22a through 21d and 22d respectively are arrayed on each of radiation lines 81a to 81d which connect the respective acoustic centers 82a to 82d of the sound collecting units 2a to 2d with the acoustic center 83 of the loudspeaker 30. Since a total number of omnidirectional microphones employed in each of the sound collecting units 2a to 2d is selected to be 2, each of the microphone units (namely, respective sound collecting units 2a to 2d) may be constructed by employing a minimum number of these omnidirectional microphones. As a consequence, the full duplex communication with the high quality can be carried out in a low apparatus cost.

In addition, a plurality of microphone units, namely, 4 pieces (in case of embodiment 1) of the sound collecting units 2a to 2d are arranged on such a concentric plane 86 that the acoustic center 83 of the loudspeaker 30 is located at a center, as viewed from the upper plane of the housing of the voice conference apparatus 1. While sensitivity characteristics 85a to 85d of the microphone units, namely, of the sound collecting units 2a to 2d are substantially identical to each other, at the same time, angles between the adjoining radiation lines 81a to 81d are equal to each other, and these radiation lines 81a to 81d connect the acoustic centers 82a to 82d of these microphone units, namely these sound collecting unit 2a to 2d with the acoustic center 83 of the loudspeaker 30. As a consequence, unequally collected sounds as to voices of plural communication persons who are present along any directions can be reduced, so that the full duplex communication having the high quality can be carried out.

In addition, the reason why 4 sets of the microphone units, namely the sound collecting units are arranged is caused by that when a table, or a room is overlooked from an upper direction, there are many rectangular shapes, or square shapes. As a consequence, it is possible to assert that this 4-set arrangement of the microphone units can expect at the highest level the uniformity of the sound collections from the respective edges of either the table or the room with employment of a minimum number of these microphone units. As a consequence, the full duplex communication with the high quality can be carried out in a low apparatus cost.

Now, the below-mentioned case will be considered: That is, assuming now that a sound collecting direction at an acoustic center of each unit as to the sound collecting units 2a to 2d is defined as an angle and a magnitude of a sensitivity thereof is defined as a radial direction, sensitivity characteristics 85a to 85d of these sound collecting units 2a to 2d are expressed based upon these angles and radial directions. As shown in FIG. 8, while orthogonal lines 84a to 84d are defined as boundaries and these orthogonal lines 84a to 84d are intersected perpendicular to the respective radiation lines 81a to 81d and also pass through the acoustic centers 82a to 82d, the sensitivity characteristics 85a to 85d are formed by employing two sets of these microphones 21a to 21d and 22a to 22d respectively of the respective sound collecting units 2a to 2d by a sensitivity characteristic forming unit (will be explained later) in such a manner that such areas of the sensitivity characteristics 85a to 85d of the respective sound collecting units 2a to 2d on the side of the loudspeaker 30 with respect to these boundaries become smaller than other areas thereof. The respective radiation lines 81a to 81d connect the acoustic centers 82a to 82d of the sound collecting units 2a to 2d with the acoustic center of the loudspeaker 30. In other words, the main lobes of the sensitivity characteristics 85a to 85d are formed in such directions that the user of the voice conference apparatus 1 considers potentially and unconsciously, namely, formed in directions over the respective radiation lines 81a to 81d, which are located opposite to the loudspeaker 30.

In this example, as to the acoustic centers 82a to 82d of the sound collecting units 2a to 2d, the below-mentioned points are set in a virtual manner: That is, these points are located over equi-distances from centers of diaphragms of a plurality of omnidirectional microphone devices, which are viewed from vibration directions of these diaphragms, namely, in the embodiment 1, these points are located over the equi-distances from the centers of the diagrams as to each of two sets of the microphones 21a to 21d and 22a to 22d respectively in such a case that these microphones 21a to 21d and 22a to 22d are viewed from the vibration directions of the diaphragms thereof. Also, as to the acoustic center 83 of the loudspeaker 30, such a center that the diaphragm of the loudspeaker 30 is viewed from the vibration direction thereof are set in the virtual manner.

While the vibration directions of the diaphragms of the respective microphones 21a to 21d and 22a to 22d are intersected substantially perpendicular with respect to the propagation direction of the compressional waves generated from the loudspeaker 30, the second microphones 22a to 22d are installed closer to the loudspeaker 30 than the first microphones 21a to 21d provided in the respective sound collecting units 2a to 2d. The below-mentioned sensitivity characteristic forming unit can form such sensitive characteristics of the respective sound collecting units 2a to 2d as shown in FIG. 8 due to the arrangement of these microphones 21a to 21d and 22a to 22d. When three, or more sets of microphones to be arranged in respective sound collecting units 2a to 2d are provided, if at least one microphone is arranged at a position closer to a loudspeaker than other microphones, while a line intersected perpendicular to radiation lines is defined as a boundary and the radiation lines connect an acoustic center of this loudspeaker with acoustic centers of the respective sound collecting units, an area of a sensitivity characteristic which is formed on the side of the loudspeaker with respect to this boundary becomes smaller than other areas of this sensitivity characteristic.

As previously described, since the desirable sensitivity characteristics 85a to 85d are formed by employing the first omnidirectional microphones 21a to 21d and the second omnidirectional microphones 22a to 22d in the respective sound collecting units 2a to 2d, the fluctuations and also the aging changes contained in the sensitivity characteristics 85a to 85d of the respective sound collecting units 2a to 2d can be reduced and the sensitivity characteristics 85a to 85d thereof can be made stable. As a result, the full duplex communication with the high quality can be carried out. Also, since these omnidirectional microphones 21a to 21d and 22a to 22d are used, the sound collecting units 2a to 2d can be made compact, and can eliminate design restrictions thereof, as compared with using of directional microphones. This reason is given as follows: That is, in the case that such directional microphones are employed, these directional microphones can be readily influenced by peripheral structural components thereof, and also, sufficiently large spaces must be secured around these directional microphones, so that the sound collecting units become bulky and the designs thereof are restricted.

The sensitivity characteristic forming unit for forming the desirable sensitivity characteristics 85a to 85d by employing 2 sets of the respective first and second microphones 21a to 21d and 22a to 22d employed in the respective sound collecting units 2a to 2d mainly corresponds to the processing circuit block 59 for processing such input signals from the first microphones 21a to 21d (will be typically expressed as "first microphone 21" in FIG. 9 and succeeding drawings thereof) provided in the DSP 50 shown in FIG. 9 in the voice conference apparatus 1 according to the embodiment 1. In FIG. 9 and the succeeding drawings thereof, the below-mentioned descriptions will be made in such a manner that the respective sound collecting units 2a to 2d are typically expressed as "2"; the respective microphones 21a to 21d and 22a to 22d are typically expressed as "21" and "22", the acoustic centers 82a to 82d of the respective sound collecting units 2a to 2d are typically expressed as 82; the respective radiation lines 81a to 81d which connect the acoustic centers 82a to 82d of the sound collecting units 2a to 2d with the acoustic center 83 of the loudspeaker 30 are typically expressed as "81"; the orthogonal lines 84a to 84d corresponding thereto are typically expressed as "84"; and further, the sensitivity characteristics 85a to 85d of the respective sound collecting units 2a to 2d are typically expressed as "85."

In FIG. 9, an A/D converter 60 and another A/D converter 64 are provided in the CODEC unit 55. Analog input signals derived from the first microphone 21 and the second microphone 22 inputted into the A/D converters 60 and 64 via the microphone driving circuits 61 and 62 are converted into digital signals.

Reference numeral 59 indicates the processing circuit block of the portion related to the present invention, which is constituted by a program stored in the program memory 51 of the DSP 50. From output data from the A/D converters 60 and 64, such signals are subtracted which are produced by delaying the opposite output data of these A/D converters 60 and 64 through delay filters 65 and 66. In the case of the embodiment 1, delay times as to these delay filters 65 and 66 are calculated based upon the following (math. 2).

$$\tau = d/c = \tfrac{1}{2} Fs = \tfrac{1}{4} f \qquad [\text{Math. 2}]$$

τ: delay times of delay filters 65 and 66

In other words, the delay time is equal to 1 sampling period "1/Fs", and when a signal waveform having the maximum processable frequency "f" is inputted, the delay filter 65, or 66 can delay the input signal wave by a delay time equal to ¼ waveform. As a consequence, emphasizing process operations as to voice of a telephone calling person and voice of a telephone receiving person can be optimized, and loads given in reverberation reducing process operations can be furthermore reduced, so that the full duplex communication with the higher quality can be carried out.

A calculator 67 subtracts the below-mentioned data from the output data of the A/D converter 64 which A/D-converts the input signal from the first microphone 21 so as to output the subtracted data. The data is obtained by delaying the output data of the A/D converter 64 by the delay time "τ" by the delay filter 66, while the A/D converter 64 A/D-converts the input signal from the second microphone 22 which is located closer to the loudspeaker 30 than the first microphone 21. Since the first microphone 21 is separated from the second microphone 22 by such a distance equal to the ¼ wavelength of the maximum processable frequency "f", the voices of the telephone receiving persons which are inputted from the loudspeaker 30 to these two microphones 21 and 22 are especially canceled with each other (will be referred to as "main beam" hereinafter).

Another calculator 68 subtracts the below-mentioned data from the output data of the A/D converter 64 which A/D converts the input signal derived from the second microphone 22 located closer to the loudspeaker 30 so as to output the subtracted data. The first-mentioned data is obtained by delaying the output data of the A/D converter 63 by the delay time "τ" by the delay filter 65, while the A/D converter 63 A/D-converts the input signal from the first microphone 21. Since the first microphone 21 is separated from the second microphone 22 by such a distance equal to the ¼ wavelength of the maximum processable frequency "f", the voices of the users (telephone calling persons) which are inputted to these two microphones 21 and 22 from such a direction different from the loudspeaker 30, more specifically, from a direction opposite from the loudspeaker 30 are canceled with each other (will be referred to as "null beam" hereinafter). Since the delaying/adding process operations are carried out, as to the input to the microphone 22 located closer to the loudspeaker 30, the voice of the telephone receiving person from the loudspeaker 30 is emphasized, whereas as to the input to the microphone 21 located opposite to the microphone 22, the voice of the telephone calling person is emphasized. As a result, a subtraction between the voice signal of the telephone receiving person and the reverberation sound of the telephone calling person can be easily carried out in an adaptive filter 69 and a subtracter 70, which will be explained later, so that the full duplex communication with the high quality can be carried out.

The subtracter 70 subtracts such a data from the output data (namely, main beam) of the calculator 67, while the first-mentioned data is obtained by filtering the output data (namely, null beam) of the calculator 68 by the adaptive filter 69. As a consequence, the voices which are inputted from the loudspeaker 30 to these two microphones 21 and 22 are furthermore cancelled with each other, and also, the reverberation sounds generated from the circumferential environment of the voice conference apparatus 1 are reduced, so that the voices of the user (telephone calling person) of the voice conference apparatus 1 can be extremely clearly transmitted to the voice conference apparatus 1 owned by a remotely separated talking person. It should also be noted that another adaptive filter (not shown) may be alternatively arranged at a post stage of the subtractor 70 in order to cancel echoes (will be referred to "linear echoes" hereinafter) occurred between the microphones 21 and 22, and the loudspeaker 30.

While the sounds from the voice conference apparatus 1 owned by the remotely separated talking person corresponding to a communication counter party is outputted from the loudspeaker 30 of the voice conference apparatus 1 with respect to the adaptive filter 69 employed in the voice conference apparatus 1 of the embodiment 1, the user of the voice conference apparatus 1 performs a learning work under such a condition that this user does not talk toward the voice conference apparatus 1. In this case, a description is made of such a case that an FIR filter is employed as one example of the adaptive filter 69.

First of all, it is possible to assume that a relationship between the output data (main beam) of the calculator 67 and such an echo signal component having a higher correlation with the output data (null beam) of the calculator 68 is theoretically expressed by the below-mentioned (Math. 3):

$$y_B(m) = x_A^{echo}(m) \qquad [\text{Math. 3}]$$

$y_B(m)$: output data (main beam) of calculator 67 at certain sampling time instant "m"

$x_A(m)$ output data (null beam) of calculator 68 at certain sampling time instant "m"

$\dot{X}$: voice of remotely separated talking person under reproduction from speaker $x_A^{echo}(m)$: echo signal component having higher correlation to null beam "$x_A(m)$"

In the (Math. 3), the echo signal component having the higher correlation with the null beam may be completely identical to the null beam if sounds inputted to the microphones 21 and 22 are purely and completely identical to sounds outputted from the loudspeaker 30. However, in an actual case, various sorts of echo signals are contained in the echo signal component, which are caused by acoustic distortions occurred when electric signals are converted into air vibrations by the loudspeaker 30, housing vibrations of the voice conference apparatus 1 caused by vibrations of the loudspeaker 30, and so on. The acoustic distortions are caused by the characteristic frequency and the frequency characteristic as to the loudspeaker 30, and in particular, high frequency distortions may cause problems in a low-cost loudspeaker. It should also be noted that this echo signal component having the higher correlation with the null beam in the (Math. 3) can be hardly calculated in a direct manner. As a consequence, the adaptive filter 69 synthesizes a quasi-echo signal based upon the null beam in accordance with the following (Math. 4):

$$\hat{x}_A^{echo}(m) = \sum_{k=n}^{P-1} w_k(m) \cdot x_A(m-k) \quad [\text{Math. 4}]$$

$\hat{x}_A^{echo}(m)$: quasi-echo signal $w_k(m)$: coefficient of adaptive filter $P$: tap number of adaptive filter The subtracter 70 subtracts the quasi-echo signal from the main beam. As a consequence, there is such a system that the echo signal is attenuated by the main beam. Accordingly, an output signal of the subtracter 70 may be calculated based upon the below-mentioned (Math. 5):

$$e(m) = y_B(m) - \hat{x}_A^{echo}(m) \quad [\text{Math. 5}]$$
$$= \hat{x}_A^{echo}(m) - \sum_{k=0}^{P-1} w_k(m) \cdot x_A(m-k)$$

$e(m)$: output signal of subtracter 70

If a predicted error of the adapter filter 69 is zero, then a relationship between a first term of a right hand side and a second term thereof in the (Math. 5) is given as the below-mentioned (Math. 6) and (Math. 7), and the output signal of the subtracter 70 in the (Math. 5) must become zero.

$$y_B(m) = \hat{x}_A^{echo}(m) \quad [\text{Math. 6}]$$

$$x_A^{echo}(m) = \sum_{k=0}^{P-1} w_k(m) \cdot x_A(m-k) \quad [\text{Math. 7}]$$

However, in an actual case, since the predicted error is present, the relationship cannot be established based upon the above-explained (Math. 6) and (Math. 7). More specifically, when only a remotely separated talking person makes a voice and a nearly separated talking person does not make a voice, such an output signal of the (Math. 5) is referred to as a "residual echo (error) signal." The residual echo signal (error signal) is expressed by the below-mentioned (Math. 8).

$$e(m) = \tilde{x}_A^{echo}(m) \quad [\text{Math. 8}]$$
$$= x_A^{echo}(m) - \hat{x}_A^{echo}(m)$$
$$= x_A^{echo}(m) - \sum_{k=0}^{P-1} w_k(m) \cdot x_A(m-k)$$

$e(m) = \tilde{x}_A^{echo}(m)$: output signal of subtracting process when only remotely separated person talks and nearly separated person does not talk In such an adaptive filter, it is important that the filter coefficient is updated (learned) in a direction along which the predicted error is decreased. Several sorts of algorithms of this learning method are known. In a general NLMS method known as better convergence of voice, the filter coefficient is updated as indicated in the below-mentioned (Math. 9).

$$\vec{w}(m) = \vec{w}(m-1) + \mu \frac{e(m)}{\vec{x_A}(m)^T \cdot \vec{x_A}(m)} \vec{x_A}(m) \quad [\text{Math. 9}]$$
$$= \vec{w}(m-1) + \mu \vec{w}'(m)$$

$\vec{x_A}(m) = [x_A(m), \ldots, x_A(m-p)]$ $\vec{w_A}(m) = [w_0(m), \ldots, w_{P-1}(m)]$ $\vec{x_A}(m)$: time series vector of input signal (reference) signal of adaptive filter $\vec{x_A}(m)^T$: transported matrix $\vec{x_A}(m)^T \cdot \vec{x_A}(m)$: power of signal reproduced from loudspeaker In accordance with this sort of algorithm, the adaptive filter 69 performs the subtracting operation of the echo signal components and the updating operation of the coefficient in a parallel mode so as to continuously attenuate the echo signal components of the null beam mixed in the main beam, so that the adaptive filter 69 can output only such a main beam approximated to the pure main beam, namely only the output signal of the nearly separated talking person. It should also be understood that although the FIR filter is described as one example of the adaptive filter 69 employed in the embodiment 1, the adaptive filter 69 of the voice conference apparatus 1 according to the embodiment 1 is not especially limited only to such an FIR filter. Alternatively, for instance, a frequency domain adaptive filter and a sub-band splitting type adaptive filter may be employed.

Conventionally, an adaptive filter is employed in order to perform such an adaptive process operation that a voice of a nearly separated talking person located along a certain direction is more clearly extracted. In contrast, while the adaptive filter 69 employed in the voice conference apparatus 1 of the present embodiment 1 may maintain such a condition that the voices from the loudspeaker 30 can be heard with respect to the nearly separated talking person located around the voice conference apparatus 1, the adaptive filter 69 may contribute to cancel the echoes of the voices of the remotely separated talking person, which are outputted from the loudspeaker 30 and then are entered to the microphones 21 and 22. In particular, this adaptive filter 69 can have a merit with respect to so-called "nonlinear echoes" such as echo signals caused by acoustic distortions occurred when electric signals are converted into air vibrations by the loudspeaker 30; and echo signals caused by housing vibrations of the voice conference apparatus 1 in connection with vibrations of the loudspeaker 30. In other words, the sensitivity characteristic forming unit (corresponding to processing circuit block 59 shown in FIG. 9) of the present invention can have such featured points that the sensitivity characteristic of the microphone unit 2 is formed in such a manner that this microphone unit 2 can hardly pick up the voices outputted from the loudspeaker 30, and furthermore, the non-linear echoes can be reduced. As previously described, in order to increase this echo cancellation effect by the adaptive filter 69, if the distance "d" between the acoustic centers of these two microphones 21 and 22 is set in accordance with the (Math. 1), then this adaptive filter 69 can achieve the effect with respect especially to distortions having higher frequencies.

While one of the sound collecting units 2a to 2d of the voice conference apparatus 1 shown in FIG. 8 is typically expressed as the sound collecting unit 2, FIG. 10 is a diagram for indicating an arranging relationship between the microphones 21 and 22 arranged in this sound collecting unit 2 and the loudspeaker 30 arranged in the speaker unit 3, which is viewed from the sectional direction. Voices collected in a voice conference apparatus of a communication counter party are outputted from the loudspeaker 30. In other words, vibrations of the cone paper 31 of this loudspeaker 30 may produce compressional waves 38a and 38b of the air; the produced compressional waves 38a and 38b are propagated outside of the housing of the voice conference apparatus 1; and thus, the voices may be transferred to users who are present around this voice conference apparatus 1.

The vibration directions of the diaphragms 28 of the plurality of microphones 21 and 22 of the sound collecting unit 2 are intersected substantially perpendicular to the propagation direction of the compressional waves 38a and 38b generated from the loudspeaker 30. Also, the vibration directions of the diaphragms 28 of the plurality of microphones 21 and 22 of the sound collecting unit 2 are intersected substantially perpendicular to such a microphone unit located immediately above the microphones 21 and 22, namely, substantially perpendicular to an upper plane of a protection member 20 of the sound collecting unit 2. The vibration direction of the diaphragm 31 of the loudspeaker 30 is intersected substantially perpendicular to an upper plane of another protection member 3a located immediately above the loudspeaker 30.

At this time, although the voices produced from the loudspeaker 30, namely, the voices collected in the voice conference apparatus of the communication counter party, and the peripheral reverberation are entered to both the microphones 21 and 22, these voices and reverberation are reduced by the previously explained processing circuit block 59 shown in FIG. 9. As a result, the voice of the user who is located around the relevant voice conference apparatus 1 may be extremely clearly transferred to the voice conference apparatus of the communication counter party.

Figure 15:
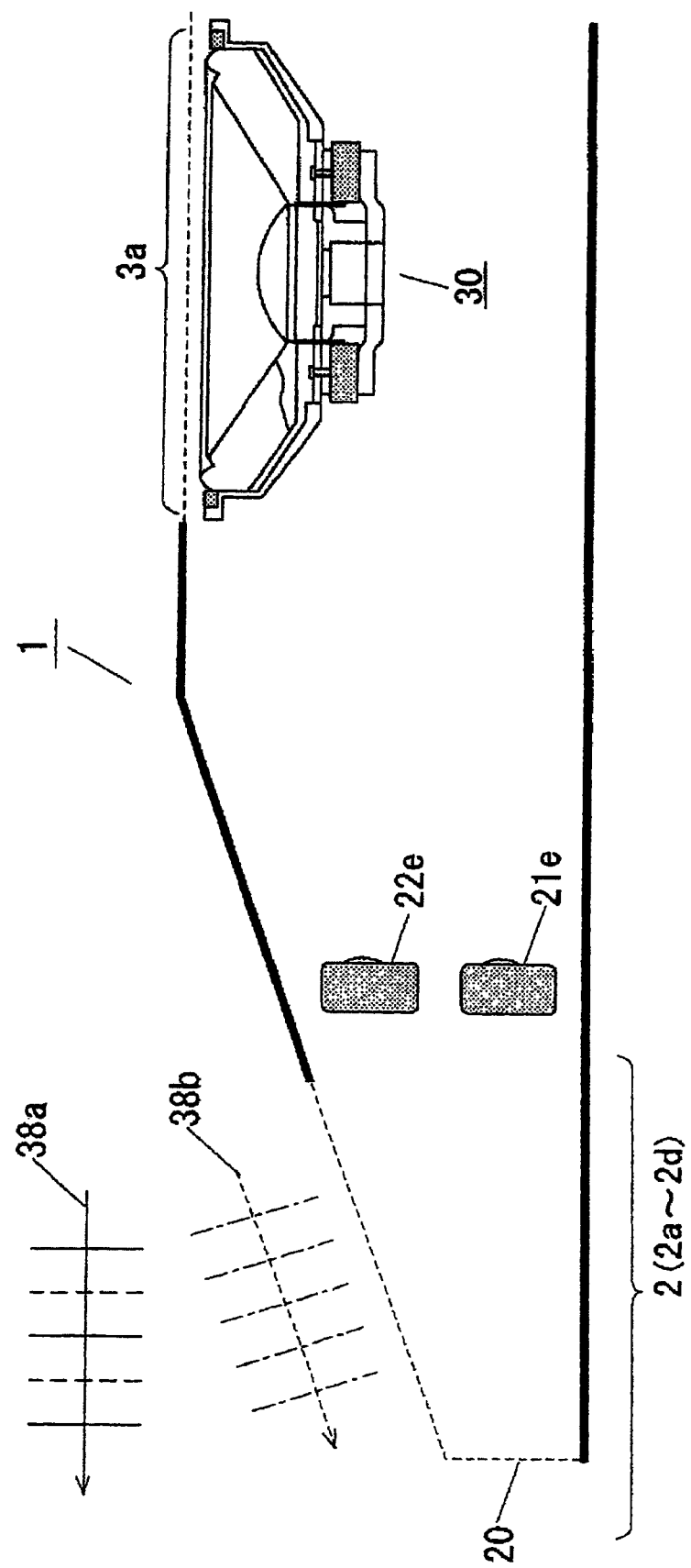
FIG. 15 is a diagram for indicating an arranging relationship between the microphones and the loudspeaker employed in the embodiment 1 of the present invention.

If the microphones 21 and 22 are arranged at positions 21e and 22e as represented in FIG. 15, then there are some possibilities that the air compressional waves of the voices which are generated from the loudspeaker 30 and are collected in the voice conference apparatus of the communication counter party can be more or less entered to these microphones 21e and 22e. However, as compared with this merit, a loss of the echo cancellation process result of FIG. 9 may become extremely large, which is caused by that substantially no distance difference from the loudspeaker 30 can be secured. As a consequence, it is preferable to arrange these two microphones 21 and 22 at the positions represented in FIG. 10.

It is desirable to arrange that a distance between planes 21p and 22p having sound collection ports of the plural microphones 21 and 22 of the microphone unit, namely the sound collecting unit 2, and the upper plane 20u of the protection member 20 of the microphone unit, namely the sound collecting unit 2 may become shorter than another distance between the protection member 20 and other plane than the first-mentioned planes 21p and 22p of the microphones 21 and 22. As a consequence, the microphone unit, namely the sound collecting unit 2 can mainly collect primary compressional waves from the loudspeaker 30, and also, can hardly collect reflection sounds within the microphone unit, namely within the sound unit 2. As a result, the load given to the reverberation reducing process operation can be decreased, so that the full duplex communication with the higher quality can be carried out.

It should also be noted that although the voice conference apparatus 1 of the embodiment 1 is equipped with only one set of the loudspeaker 30, the present invention is not limited only to a single loudspeaker, but plural sets of loudspeakers may be alternatively provided in the voice conference apparatus 1. In this alternative case, for example, such points which are separated over equi-distances from respective acoustic centers of the plural loudspeakers provided in the speaker unit when being viewed from the upper plane of the voice conference apparatus may be defined as an acoustic center of the speaker unit of the voice conference apparatus.

As previously described, in accordance with the embodiment 1, the fluctuations and the aging changes in the sensitivity characteristics 85a to 85d of the respective sound collecting units 2a to 2d can be reduced, and the sensitivity characteristics 85a to 85d can become stable, so that the full duplex communication with the higher quality can be carried out.

Embodiment 2

FIG. 16 shows an example in which signal delay times are corrected in accordance with an embodiment 2 of the present invention. A different point between FIG. 16 and FIG. 10 is given as follows: That is, it is so assumed that a position of a telephone calling person is located parallel to a desk plane and the telephone calling person is present along a direction inclined from an extension line direction of two sets of first and second microphones 21 and 22 by an angle of "θ", which may reflect a more actual case. From output data from the respective A/D converters 60 and 64, such digital signals are subtracted which are produced by delaying the output data derived from the opposite A/D converters 60 and 64 through the delay filters 65 and 66. In the case of the embodiment 2, a delay time "$\tau_1$" of the delay filter 65 which is applied to the second microphone 22 may be calculated based upon the below-mentioned (Math. 10), while the second microphone 22 is located closer to the loudspeaker 30 than the first microphone 21:

$$\tau_1 = d/c \quad [\text{Math. 10}]$$

d: interval between two microphones 21 and 22
c: sound velocity in the air

On the other hand, a delay time "$\tau_2$" of the delay filter 66 which is applied to the first microphone 21 may be calculated based upon the below-mentioned (Math. 11), while the first microphone 21 is located far from the loudspeaker 30 than the second microphone 22 in FIG. 16:

$$\tau_2 = d \cdot \cos\theta / c \quad [\text{Math. 11}]$$

d: interval between two microphones 21 and 22
c: sound velocity in the air
θ: angle formed by an extension line of connecting two microphones 21/22 to each other and a line extending to a position of telephone calling person from the two microphones 21/22

That is to say, this delay time "$\tau_2$" is shorter than the delay time "$\tau_1$". As a result, the voice signal derived from the direction along which the telephone calling person is actually located is emphasized, so that the sound collecting efficiency can be furthermore improved, and thus, the full duplex communication with the higher equality can be carried out.

A description is made of an example as to the effect achieved by setting the delay times in the above-described manner with reference to FIG. 16. In this example, assuming now that a microphone unit interval is d=14 mm, and an angle defined between the extension direction of the microphone unit and the desk plane is θ=30 degrees, directivity patterns are exemplified in FIG. 16.

Firstly, directivity patterns of main beams are indicated. A main beam corresponds to an output signal of such a directivity pattern synthesized in such a manner that a sensitivity thereof is high with respect to a voice direction of a nearly separated talking person, and an opposite side thereof becomes a dead angle. In FIG. 16(a), the main beam has such a purpose that a directivity angle is directed to a direction parallel to the desk plane and indicated by as arrow "a." In the case of this drawing, such a delay coincident with a difference in reaching times of sound waves between both the microphones 21 and 22 may be given to a microphone signal of such a microphone located closer to the nearly separated talking person than the other microphone in such a manner that the microphone signal of the microphone located closer to the nearly separated talking person is made coincident with the microphone signal of the microphone located far from the nearly separated talking person. In such a case that this delay time "$\tau_2$" is given as $\tau_2 = d/c$, as represented in a circular graph of FIG. 16(b), a large amount of sensitivities are also left along the opposite direction of the nearly separated talking person, and a dead angle is insufficiently formed. On the other hand, in the case that the delay time "$\tau_2$" is given as $\tau_2 = d \cdot \cos\theta/c$, as indicated in a circular graph of FIG. 16(c), a sharp dead angle is formed along the opposite direction of the nearly separated talking person. As a result, it can be understood that this case of FIG. 16(c) may provide a better result.

Next, directivity patterns of null beams are illustrated. A null beam corresponds to an output signal of such a directivity pattern synthesized in such a manner that a sensitivity thereof is high with respect to a direction of a speaker of the voice conference apparatuses, namely, a maximum reaching direction of an acoustic echo, and an opposite side thereof becomes a dead angle. In FIG. 16(a), the null beam has such a purpose that a directivity angle is directed to a direction of the loudspeaker 30 over the extension line of these two microphones 21 and 22 which is indicated by an angle of "b." In the case of this drawing, such a delay coincident with a difference between reaching times of sound waves between both the microphones 21 and 22 may be given to a microphone signal of such a microphone located closer to the loudspeaker 30 in such a manner that the microphone signal of the microphone located closer to the loudspeaker 30 is made coincident with the microphone signal of the microphone located far from the loudspeaker 30. In such a case that this delay time "$\tau_1$" is given as $\tau_1 = d/c$, as represented in a circular graph of FIG. 16(d), a sharp dead angle is formed along the opposite direction of the loudspeaker 30. As a result, it can be understood that this delay time "$\tau_1$" becomes appropriate. On the other hand, similar to the main beam side, in such a case that the delay time $\tau_1 = d \cdot \cos\theta/c$ is applied, as indicated in a circular graph of FIG. 16(e), a large amount of sensitivities is also left along the opposite direction of the loudspeaker 30, and a dead angle is insufficiently formed.

As previously described in this embodiment 2, the travel path differences calculated by transforming the delay time "τ" for synthesizing the directivity along the target sound source directions on the side of the main beam and of the null beam are applied respectively, so that the directivity of the main beam and the directivity of the null beam can be correctly realized.

Embodiment 3

Figure 17:
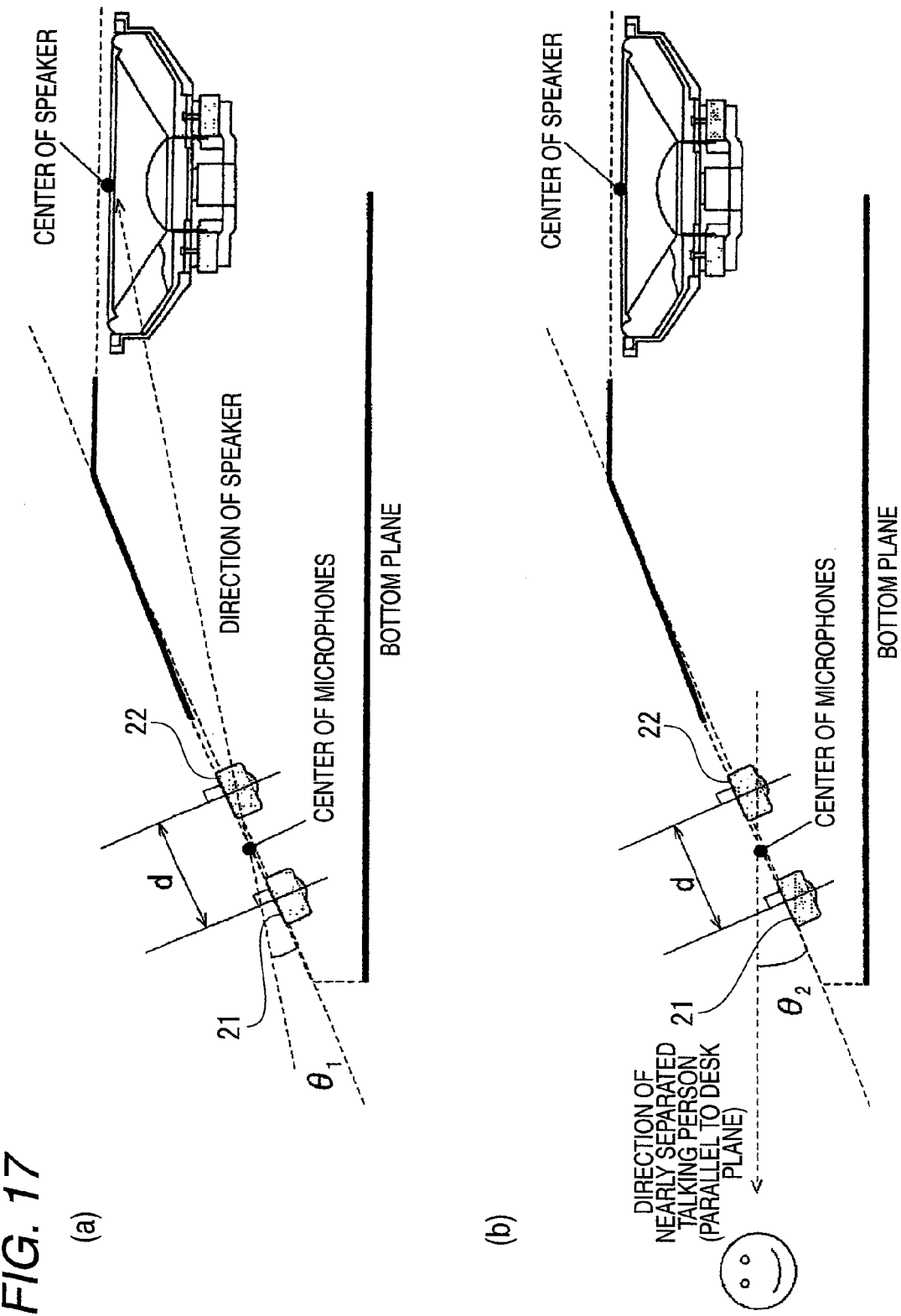
FIG. 17 is a diagram for indicating another example as to a correction of a signal delay time as to a voice conference apparatus according to an embodiment 3 of the present invention.

FIG. 17 shows another example in which signal delay times are corrected in accordance with an embodiment 3 of the present invention. As compared with FIG. 16, as shown in FIG. 17(b), such a condition that a position of a telephone calling person is located parallel to a desk plane and the telephone calling person is present along a direction inclined from an extension line direction of two microphones 21 and 22 by an angle of "$\theta_2$" is similar to the condition of FIG. 16(a). However, in addition, an acoustic center of a loudspeaker 30 is not located along the extension line direction of these two microphones 21 and 22, but is located along a direction of an angle "$\theta_1$." In the case of the embodiment 3, a delay time "$\tau_1$" of the delay filter 65 which is applied to the second microphone 22 may be calculated based upon the below-mentioned (Math. 12), while the second microphone 22 is located closer to the loudspeaker 30 than the first microphone 21:

$$\tau_1 = d \cdot \cos\theta_1 / c \quad [\text{Math. 12}]$$

d: interval between two microphones 21 and 22
c: sound velocity in the air
$\theta_1$: angle from extension line of 2 microphones to acoustic center of loudspeaker On the other hand, as represented in FIG. 17(b), a delay time "$\tau_2$" of the delay filter 66 which is applied to the first microphone 21 may be calculated based upon the below-mentioned (Math. 13), while the first microphone 21 is located far from the loudspeaker 30 than the second microphone 22:

$$\tau_2 = d \cdot \cos\theta_2 / c \quad [\text{Math. 13}]$$

d: interval between two microphones
c: sound velocity in the air
$\theta_2$: angle from extension line of two microphones to position of telephone calling person Since the above-described arrangement is employed, in the main beam, the voice signal derived from such a direction along which the telephone calling person is actually located may be emphasized, and in the null beam, the signal derived from such a direction along which the loudspeaker 30 is actually located may be emphasized. As a result, the sound collecting effect can be furthermore improved, and therefore, the full duplex communication with the higher quality can be carried out.

Embodiment 4

In the embodiment 1, as indicated in (Math. 1), the distance "d" between two sets of the first microphones 21 (21a to 21d) and the second microphones 22 (22a to 22d) is selected to be approximately ¼ of the wavelength of the maximum processable frequency "f." Alternatively, this distance "d" may be decreased, while the sampling frequency "Fs" and the maximum processable frequency "f" are not changed. That is to say, instead of the above-explained distance "d", such a distance "x" calculated based upon the below-mentioned (Math. 14) is defined as such a distance between two sets of the microphones 21 (namely, 21a to 21d) and the microphones 22 (namely, 22a to 22d) in an embodiment 4 of the present invention:

$$x = h \cdot d \, (h < 1) \qquad \text{[Math. 14]}$$

In this case, the delay time "τ" as to the delay filters 65 and 66 provided in the circuit of FIG. 9 is calculated in accordance with the below-mentioned (Math. 15):

$$\tau = x/c = h/Fs \, (h < 1) \qquad \text{[Math. 15]}$$

In other words, the delay time "τ" may be selected to be such a value obtained by multiplying the sampling period "1/Fs" by "h" (h<1).

As previously described, in accordance with the embodiment 4, the distance between two sets of the microphones 21 and 22 arranged in the microphone unit, namely in the sound collecting unit 2 can be furthermore shortened. As a result, it is possible to reduce that reflection sounds different from each other are entered to the respective microphones 21 and 22, so that the full duplex communication with the higher quality can be carried out.

Embodiment 5

Figure 18:
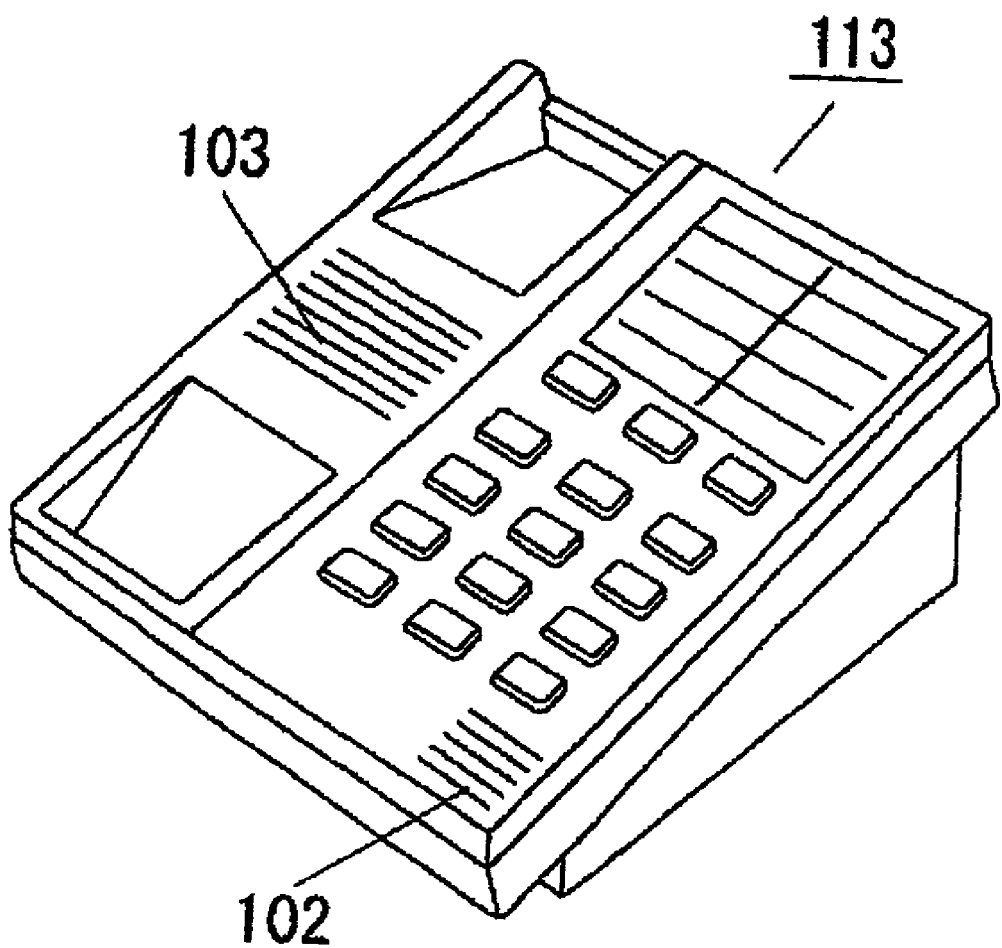
FIG. 18 is a perspective view for showing a telephone employed in a voice conference apparatus according to an embodiment 5 of the present invention.
Figure 19:
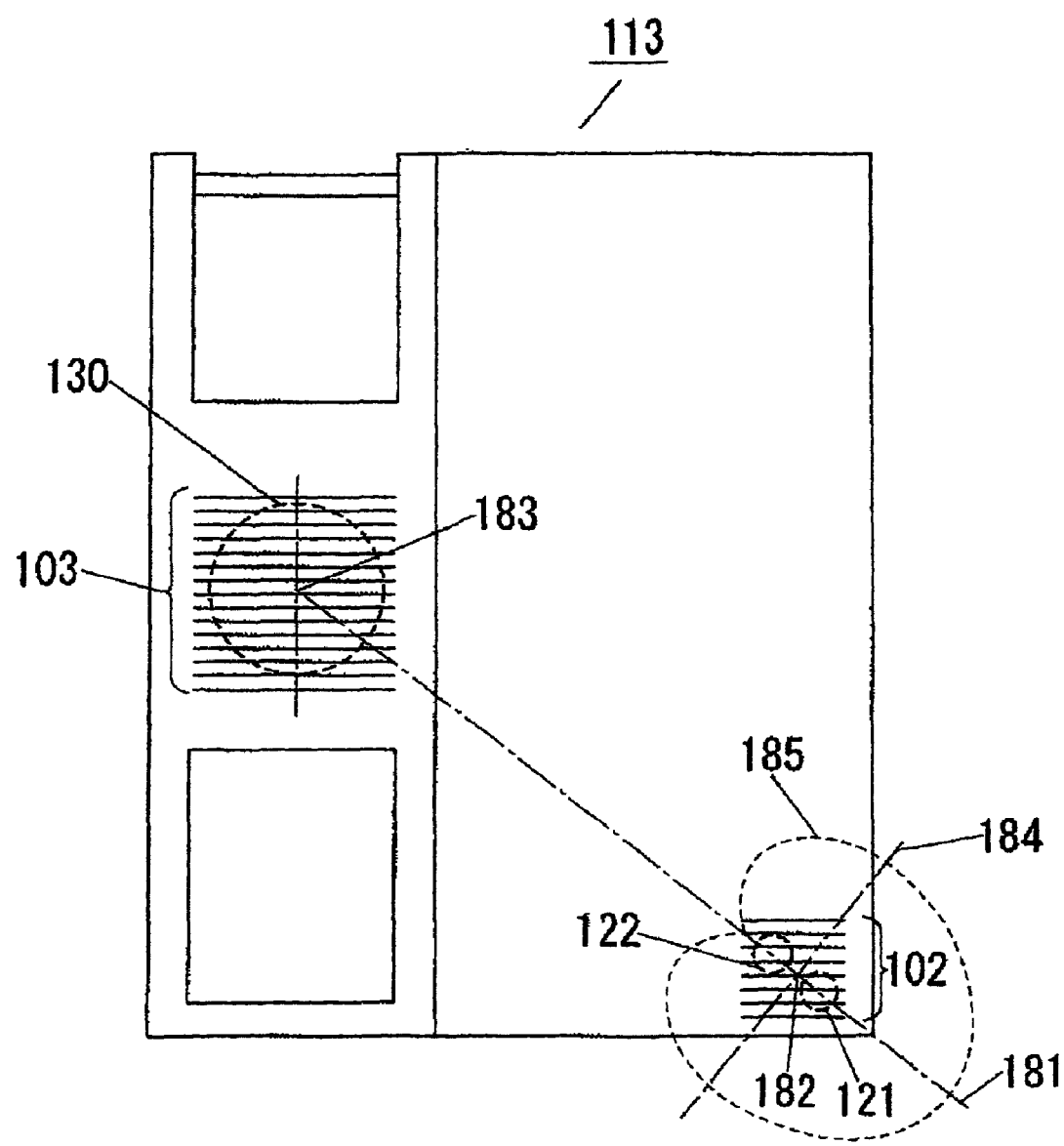
FIG. 19 is an upper view for showing a telephone employed in a voice conference apparatus according to the embodiment 5 of the present invention.

FIG. 18 is a perspective view for showing a telephone set 113 according to an embodiment 5 of the present invention, namely represents such a telephone set 113 to which any one of the voice conference apparatuses of the embodiments 1, 2, 3, 4 is applied. FIG. 19 is an upper view of the telephone set 113 according to the embodiment 5 of the present invention, namely shows the telephone set 113 of FIG. 18 which is viewed from an upper plane thereof.

As indicated in FIG. 18, similar to the voice conference apparatus 1 of the embodiment 1, the telephone set 113 of this embodiment 5 is equipped with a sound collecting unit 102 and a speaker unit 103. It should be noted that only one set of the sound collecting unit 102 is employed which is different from the voice conference apparatus 1 of the embodiment 1.

In the sound collecting unit 102 and the speaker unit 103 shown in FIG. 19, microphone devices 121 and 122 and a loudspeaker 130 are illustrated in such a manner that positions of these structural components can be visually recognized. In an actual case, these structural components are arranged within the sound collecting unit 102 and the speaker unit 103, and therefore, cannot be directly and visibly recognized.

While plural pieces of such telephone sets 113 are employed in a similar manner to the voice conference apparatus 1a, or 1b shown in FIG. 3, or FIG. 4 of the embodiment 1, these plural telephone sets 113 are connected via either the Internet 11 or the public telephone line 12 to each other in order to transmit/receive voice signals of the respective telephone sets 113.

Hardware of the telephone set 113 according to the embodiment 5 has no large different points from those of the voice conference apparatuses 1 shown in FIG. 5 and FIG. 6 of the embodiment 1, and therefore, may be realized by merely adding a telephone calling/receiving interface of a handset to these voice conference apparatuses 1. With respect to 2 pieces of omnidirectional microphone devices 121 and 122 which are installed in the microphone unit, namely the sound collecting unit 102, and further, the loudspeaker 130 installed in the speaker unit 103, such microphone devices and a loudspeaker having no large different points from those shown in the embodiment 1 may be employed.

In the microphone unit, namely the sound collecting unit 102, two sets of the omnidirectional microphone devices 121 and 122 are arranged in such a manner that these microphone apparatus 121 and 122 are arranged on a radiation line 181 which connects an acoustic center 182 of the sound collecting unit 102 with an acoustic center 183 of the loudspeaker 130.

Since a total number of omnidirectional microphone devices employed in the sound collecting unit 102 of each of the telephone set 113 is selected to be 2, the microphone unit, namely the sound collecting unit 102 of each of the telephone set 113 may be alternatively constituted by employing a minimum number of such omnidirectional microphones. As a consequence, the full duplex communication with the high quality can be carried out in a low apparatus cost.

While the vibration directions of the diaphragms of the respective microphone devices 121 and 122 are intersected substantially perpendicular with respect to the propagation direction of the compressional waves generated from the loudspeaker 130, the second microphone apparatus 122 is installed closer to the loudspeaker 130 than the first microphone apparatus 121. It should be noted that a distance between the first microphone apparatus 121 and the second microphone apparatus 122 may be selected to be the distance "d" conducted based upon the (Math. 1) of the embodiment 1, or may be alternatively selected to be the above-explained distance "x" conducted based upon the (Math. 14) of the embodiment 4.

While such an orthogonal line 184 is defined as a boundary and this orthogonal line 184 corresponds to a radiation line 181 which connects an acoustic center 182 of the sound collecting unit 102 with another acoustic center 183 of the loudspeaker 130, such a sensitivity characteristic 185 is formed by such a similar sensitivity characteristic forming unit to the sensitivity characteristic forming unit indicated in the embodiment 1 and the embodiment 2 with employment of two sets of the microphone devices 121 and 122 of the sound collecting unit 102 in such a manner that an area of this sensitivity characteristic 185 of the sound collecting unit 102 on the side of the loudspeaker 130 with respect to this boundary may become smaller than other areas of this sensitivity characteristic 185.

With employment of the above-described arrangement, since the desirable sensitivity characteristic 185 is formed by employing the omnidirectional microphone apparatus 121 and 122 in the respective sound collecting unit 102, the fluctuations and also the aging changes contained in the sensitivity characteristic 185 of the respective sound collecting units 102 can be reduced and the sensitivity characteristic 185 thereof can be made stable. As a result, the full duplex communication with the high quality can be carried out. Also, the voice signals of the user (telephone calling person) of the telephone set 113 can be extremely clearly transmitted to the telephone set of the telephone counter party. Moreover, since these omnidirectional microphone devices 121 and 122 are used, the sound collecting unit 103 can be made compact, and can eliminate design restrictions thereof, as compared with using of directional microphones. This reason is given as follows: That is, in the case that the directional microphones are employed, these directional microphones can be readily influenced by peripheral structural components thereof, and also, sufficiently large spaces must be secured around these directional microphones, so that the sound collecting unit becomes bulky and the design thereof is restricted.

It is desirable to arrange that a distance between a plane containing sound collection ports of the plural microphone devices 121 and 122 of the microphone unit, namely the sound collecting unit 102, and an upper plane of a protection member of the microphone unit, namely the sound collecting unit 102 may become shorter than another distance between the protection member and other plane than the first-mentioned plane of the microphone devices 121 and 122. As a consequence, the microphone unit, namely the sound collecting unit 102 can mainly collect primary compressional waves from the loudspeaker 130, and also, can hardly collect reflection sounds within the microphone unit, namely within the sound unit 102. As a result, the load given to the reverberation reducing process operation can be decreased, so that the full duplex communication with the higher quality can be carried out.

The voice conference apparatuses according to the present invention may be utilized to, for instance, telephone sets, voice conference systems, television conference systems, and the like.

Many modifications and variations of the present invention are possible in the light of the above techniques. It is therefore to be understood that within the scope of the invention, the invention may be practiced than as specifically described. The present application is based upon and claims the benefit of priority of Japanese Patent Application Nos. 2007-48762 and 2008-10131 filed on Feb. 28, 2007 and Jan. 21, 2008, respectively, the contents of which are incorporated herein by references in its entirety.

What is claimed is:

1. A conference apparatus, comprising:
    a sound collector which has a plurality of omnidirectional microphones for collecting a sound to output a transmission audible signal;
    a sound transmitter which emits a sound on the basis of a reception audible signal;
    a communicator which transmits the transmission audible signal and receives the reception audible signal; and
    a sensitivity characteristic former which forms a sensitivity characteristic of the sound collector,
    wherein at least one of the plurality of omnidirectional microphones is arranged closer to the sound transmitter than another of the plurality of omnidirectional microphones.

2. A conference apparatus, comprising:
    a sound collector which has a plurality of omnidirectional microphones for collecting a sound to output a transmission audible signal;
    a sound transmitter which emits a sound on the basis of a reception audible signal;
    a communicator which transmits the transmission audible signal and receives the reception audible signal; and
    a sensitivity characteristic former which forms a sensitivity characteristic of the microphone,
    wherein the sensitivity characteristic of the sound collector is represented by a figure, each point on the figure showing a magnitude of a sensitivity in a direction of the point with respect to an acoustic center of the sound collector as a distance between the point and the acoustic center of the sound collector; and
    wherein, when an orthogonal line is perpendicular to a radiation line for connecting the acoustic center of the sound collector and an acoustic center of the sound transmitter, and passes through the acoustic center of the sound collector, the sensitivity characteristic former forms the sensitivity characteristic of the sound collector so that an area made by the orthogonal line and the figure on the side of the sound transmitter is smaller than an area made by the orthogonal line and the figure on the opposite side from the sound transmitter.

3. The conference apparatus according to claim 2, wherein at least one microphone among the plurality of omnidirectional microphones of the sound collector is arranged closer to the sound transmitter than a remaining omnidirectional microphones of the sound collector.

4. The conference apparatus according to claim 3, wherein a distance between a plane having sound collecting ports for the omnidirectional microphones of the sound collector and an upper plane of a protection member of the sound collector for protecting the omnidirectional microphones is smaller than a distance between the upper plane of the protection member and any other plane of the sound collector.

5. The conference apparatus according to claim 3, wherein the sound collector has two omnidirectional microphones which are arranged on the radiation line for connecting the acoustic center of the sound collector and the acoustic center of the sound transmitter.

6. The conference apparatus according to claim 5, wherein, when a sampling frequency is defined as "Fs", sound velocity is defined as "c", a maximum processable frequency is defined as "f", and a wavelength of the maximum processable frequency "f" is defined as "$\lambda$", a distance "d" between acoustic centers of the two omnidirectional microphones is given as follows:

$$d = \tfrac{1}{2} Fs = c/4f = (\tfrac{1}{4})\lambda.$$

7. The conference apparatus according to claim 6, wherein the distance "d" is corrected as "d'=d/cos θ", when that an angle formed by an extension line for connecting the acoustic centers of the two omnidirectional microphones to each other and the radiation line for connecting the acoustic center of the sound transmitter and the acoustic center of the sound collector is defined as "θ."

8. The conference apparatus according to claim 6, wherein the distance "d" is corrected to a distance "d'" which is greater than the distance "d" so that an S/N ratio of an acoustic signal with respect to an electric noise is greater than or equal to a predetermined value.

9. The conference apparatus according to claim 8, wherein the predetermine value is 35 dB.

10. The conference apparatus according to claim 5, wherein the sensitivity characteristic former includes:
    a first delayer which delays an input signal from a first omnidirectional microphone, located closer to the sound transmitter, of the two omnidirectional microphones of the sound collector by a predetermined delay time to output a first delayed signal;
    a second delayer which delays an input signal from a second omnidirectional microphone, located further from the sound transmitter, of the two omnidirectional microphones of the sound collector by a predetermined delay time to output a second delayed signal;

a first calculator which subtracts the first delayed signal of the first delayer from the input signal from the second omnidirectional microphone;

a second calculator which subtracts the second delayed signal of the second delayer from the input signal from the first omnidirectional microphone;

an adaptive filter which performs an adaptive learning operation with respect to an output signal of the second calculator; and a third calculator which subtracts an output signal of the adaptive filter from the first delayed signal of the first delayer.

11. The conference apparatus according to claim 10, wherein when a distance between the acoustic centers of the omnidirectional microphones of the sound collector is defined as "d" and sound velocity is defined as "c", the predetermined delay times of the first delayer and the second delayer are equal to a delay time "τ" given as follows:

$\tau = d/c.$

12. The conference apparatus according to claim 3, wherein a plurality of the sound collectors are arranged on a circle with the acoustic center of the sound transmitter as the center of the circle;

wherein sensitivity characteristics of the sound collectors are substantially identical to each other; and wherein radiation lines each connect one of acoustic centers of the sound collectors and the acoustic center of the sound transmitter, and angles formed by adjacent ones of the radiation lines are equal to each other.

13. The conference apparatus according to claim 12, wherein 4 four of the sound collectors are provided.

14. The conference apparatus according to claim 5, wherein when a sampling frequency is defined as "Fs", sound velocity is defined as "c", a maximum processable frequency is defined as "f", and a wavelength of the maximum processable frequency "f" is defined as "λ", a distance "x" between acoustic centers of the two omnidirectional microphones of the sound collector is given as follows:

$x = hc/2Fs = hc/4f = (¼)h\lambda$ wherein h<1.

15. The conference apparatus according to claim 10, wherein, when a distance between the acoustic centers of the two omnidirectional microphones of the sound collector is defined as "d" and sound velocity is defined as "c", the predetermined delay time of the first delayer is equal to a delay time "$\tau_1$" given as follows: $\tau_1 = d/c$, and the predetermined delay time of the second delayer is equal to a delay time "$\tau_2$" given as follows; $\tau_2 = d \cdot \cos \theta/c$, while an angle formed by an extension line for connecting the acoustic centers of the two omnidirectional microphones to each other and a line for connecting the acoustic center of the sound collector and a communication person is defined as "θ."

16. The conference apparatus according to claim 10, wherein, when a distance between the acoustic centers of the two omnidirectional microphones of the sound collector is defined as "d" and sound velocity is defined as "c", the predetermined delay time of the first delayer is equal to a delay time "$\tau_1$" given as follows: $\tau_1 = d \cdot \cos \theta_1/c$, and the predetermined delay time of the second delayer is equal to a delay time "$\tau_2$" given as follows; $\tau_2 = d \cdot \cos \theta_2/c$; and wherein an angle formed by an extension line for connecting the acoustic centers of the two omnidirectional microphones to each other and a line for connecting the acoustic center of the sound collector and the acoustic center of the sound transmitter is defined as "$\theta_1$", and an angle formed by the extension line for connecting the acoustic centers of the two omnidirectional microphones and a line for connecting the acoustic center of the sound collector and a communication person is defined as "$\theta_2$."

17. The conference apparatus according to claim 1, wherein a plurality of sound collectors are arranged symmetrically around a center of the apparatus.

18. The conference apparatus according to claim 1, wherein a plurality of sound collectors are arranged in four corners of the apparatus.

19. The conference apparatus according to claim 1, wherein at least two sound collectors, each sound collector including at least two microphones, and the sound transmitter are arranged such that an acoustic center of the at least two sound collectors, the at least two microphones and the sound transmitter are on a same line.

20. A conference apparatus, comprising:

a sound collector which has a plurality of omnidirectional microphones for collecting a sound to output a transmission audible signal;

a sound transmitter which emits a sound on the basis of a reception audible signal;

a communicator which transmits the transmission audible signal and receives the reception audible signal; and a sensitivity characteristic former which forms a sensitivity characteristic of the microphone, wherein a distance d between acoustic centers of two of the plurality of omnidirectional microphones is defined as:

$d = (¼)/\lambda,$ wherein λ is a wavelength of a maximum processable frequency.

21. A conference apparatus, comprising:

a sound collector which has a plurality of microphones for collecting a sound to output a transmission audible signal;

a sound transmitter which emits a sound on the basis of a reception audible signal; and a sensitivity characteristic former which forms a sensitivity characteristic of the sound collector, wherein at least one of the plurality of microphones is arranged closer to the sound transmitter than the other of the plurality of microphones.

22. A conference apparatus, comprising:

a sound collector which has a plurality of microphones for collecting a sound to output a transmission audible signal;

a sound transmitter which emits a sound on the basis of a reception audible signal; and a sensitivity characteristic former which forms a sensitivity characteristic of the microphone, wherein the sensitivity characteristic of the sound collector is represented by a figure, each point on the figure showing a magnitude of a sensitivity in a direction of the point with respect to an acoustic center of the sound collector as a distance between the point and the acoustic center of the sound collector; and wherein, when an orthogonal line is perpendicular to a radiation line for connecting the acoustic center of the sound collector and an acoustic center of the sound transmitter, and passes through the acoustic center of the sound collector, the sensitivity characteristic former forms the sensitivity characteristic of the sound collector so that an area made by the orthogonal line and the figure on the side of the sound transmitter is smaller than an area made by the orthogonal line and the figure on the opposite side from the sound transmitter.

* * * * *